US008799882B2

(12) United States Patent
Tarditi, Jr. et al.

(10) Patent No.: US 8,799,882 B2
(45) Date of Patent: Aug. 5, 2014

(54) COMPILER SUPPORT FOR OPTIMIZING DECOMPOSED SOFTWARE TRANSACTIONAL MEMORY OPERATIONS

(75) Inventors: David Read Tarditi, Jr., Kirkland, WA (US); Timothy Lawrence Harris, Cambridge (GB); Mark Ronald Plesko, Kirkland, WA (US); Avraham E. Shinnar, New Rochelle, NY (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 11/389,451

(22) Filed: Mar. 23, 2006

(65) Prior Publication Data

US 2007/0169030 A1   Jul. 19, 2007

Related U.S. Application Data

(60) Provisional application No. 60/748,386, filed on Dec. 7, 2005.

(51) Int. Cl.
*G06F 9/45* (2006.01)

(52) U.S. Cl.
USPC .......................................................... 717/151

(58) Field of Classification Search
None
See application file for complete search history.

(56) References Cited

U.S. PATENT DOCUMENTS

| | | | |
|---|---|---|---|
| 5,535,352 A | 7/1996 | Bridges et al. | |
| 5,949,088 A * | 9/1999 | Morgan | ............................ 257/5 |
| 6,059,840 A | 5/2000 | Click, Jr. | |
| 6,151,607 A | 11/2000 | Lomet | |
| 6,151,704 A | 11/2000 | Radigan | |
| 6,247,174 B1 | 6/2001 | Santhanam et al. | |
| 6,272,607 B1 * | 8/2001 | Baentsch et al. | .............. 711/162 |
| 6,289,357 B1 | 9/2001 | Parker | |
| 6,341,285 B1 | 1/2002 | Blott et al. | |

(Continued)

FOREIGN PATENT DOCUMENTS

| | | |
|---|---|---|
| RU | 2 206 119 | 6/2003 |
| WO | WO 2004/075046 | 9/2004 |
| WO | WO 2004/075051 | 9/2004 |

OTHER PUBLICATIONS

Andrade et al., "Efficient Execution of Multi-Query Data Analysis Batches Using Compiler Optimization Strategies," Lecture Notes in Computer Science, 15 pages. (2004).
Finkelstein, "Common Expression Analysis in Database Application," Proceedings of the 1982 ACM SIGMOD International Conference on Management of Data, pp. 235-245 (1982).

(Continued)

*Primary Examiner* — Li B Zhen
*Assistant Examiner* — Evral Bodden
(74) *Attorney, Agent, or Firm* — Kevin Sullivan; Kate Drakos; Mickey Minhas

(57) ABSTRACT

A software transactional memory system is described which utilizes decomposed software transactional memory instructions as well as runtime optimizations to achieve efficient performance. The decomposed instructions allow a compiler with knowledge of the instruction semantics to perform optimizations which would be unavailable on traditional software transactional memory systems. Additionally, high-level software transactional memory optimizations are performed such as code movement around procedure calls, addition of operations to provide strong atomicity, removal of unnecessary read-to-update upgrades, and removal of operations for newly-allocated objects. During execution, multi-use header words for objects are extended to provide for per-object housekeeping, as well as fast snapshots which illustrate changes to objects. Additionally, entries to software transactional memory logs are filtered using an associative table during execution, preventing needless writes to the logs. Finally a garbage collector with knowledge of the software transactional memory system compacts software transactional memory logs during garbage collection.

10 Claims, 26 Drawing Sheets

(56) References Cited

U.S. PATENT DOCUMENTS

| | | | |
|---|---|---|---|
| 6,427,154 | B1 | 7/2002 | Kolodner et al. |
| 6,457,023 | B1 | 9/2002 | Pinter et al. |
| 6,505,291 | B1* | 1/2003 | Sollars ........................ 712/201 |
| 6,553,392 | B1 | 4/2003 | Mosher, Jr. et al. |
| 6,560,773 | B1 | 5/2003 | Alexander, III et al. |
| 6,622,300 | B1* | 9/2003 | Krishnaswamy et al. .... 717/130 |
| 6,658,652 | B1 | 12/2003 | Alexander, III et al. |
| 6,662,362 | B1 | 12/2003 | Arora et al. |
| 6,694,340 | B1 | 2/2004 | Lyle et al. |
| 6,839,726 | B2 | 1/2005 | Kawamoto |
| 6,898,602 | B2 | 5/2005 | Sayag |
| 7,010,553 | B2 | 3/2006 | Chen et al. |
| 7,069,279 | B1 | 6/2006 | Rau et al. |
| 7,103,597 | B2 | 9/2006 | McGoveran |
| 7,117,229 | B2 | 10/2006 | Marshall et al. |
| 7,240,171 | B2 | 7/2007 | Barton et al. |
| 7,278,137 | B1 | 10/2007 | Fuhler et al. |
| 7,325,108 | B2 | 1/2008 | Tuel |
| 7,346,486 | B2* | 3/2008 | Ivancic et al. ................... 703/22 |
| 7,555,619 | B2 | 6/2009 | Harris |
| 7,590,806 | B2 | 9/2009 | Harris et al. |
| 7,607,123 | B2 | 10/2009 | Chavan |
| 7,716,630 | B2* | 5/2010 | Wholey et al. ................ 717/100 |
| 7,747,565 | B2 | 6/2010 | Harris et al. |
| 7,810,085 | B2 | 10/2010 | Shinnar et al. |
| 7,810,086 | B2 | 10/2010 | Murphy et al. |
| 7,861,237 | B2 | 12/2010 | Tarditi et al. |
| 8,099,726 | B2 | 1/2012 | Harris |
| 8,266,609 | B2 | 9/2012 | Harris |
| 2002/0107879 | A1 | 8/2002 | Arnold et al. |
| 2002/0138507 | A1 | 9/2002 | Shuf et al. |
| 2003/0069905 | A1 | 4/2003 | Dussud |
| 2003/0084038 | A1 | 5/2003 | Balogh et al. |
| 2003/0120873 | A1 | 6/2003 | Kanaley |
| 2004/0107416 | A1 | 6/2004 | Buban et al. |
| 2004/0122876 | A1 | 6/2004 | Hudson et al. |
| 2004/0187123 | A1 | 9/2004 | Tremblay et al. |
| 2005/0044538 | A1 | 2/2005 | Mantripragada |
| 2005/0097078 | A1 | 5/2005 | Lohman et al. |
| 2005/0166167 | A1* | 7/2005 | Ivancic et al. ..................... 716/5 |
| 2006/0004860 | A1 | 1/2006 | Liedes et al. |
| 2006/0048119 | A1* | 3/2006 | Ren et al. ...................... 717/160 |
| 2006/0173885 | A1 | 8/2006 | Moir et al. |
| 2006/0282476 | A1* | 12/2006 | Dolby et al. .................. 707/201 |
| 2007/0011668 | A1* | 1/2007 | Wholey et al. ................ 717/151 |
| 2007/0028056 | A1 | 2/2007 | Harris |
| 2007/0130238 | A1 | 6/2007 | Harris et al. |
| 2007/0136290 | A1 | 6/2007 | Shinnar et al. |
| 2007/0136365 | A1 | 6/2007 | Tarditi et al. |
| 2007/0143276 | A1 | 6/2007 | Harris |
| 2007/0143287 | A1 | 6/2007 | Adl-tabatabai et al. |
| 2007/0143360 | A1 | 6/2007 | Harris et al. |
| 2007/0143741 | A1 | 6/2007 | Harris et al. |
| 2007/0157200 | A1 | 7/2007 | Hopkins |
| 2007/0169030 | A1 | 7/2007 | Tarditi et al. |
| 2008/0172662 | A1 | 7/2008 | Harris et al. |

OTHER PUBLICATIONS

International Search Report and Written Opinion for PCT/US06/45526, dated Mar. 26, 2008, 12 pages.
Agesen et al., "An Efficient Meta-Lock for Implementing Ubiguitous Synchronization", 30 pages, (Apr. 1999).
Bacon et al., "Thin locks: featherweight synchronization for Java", pp. 258-268, (Jun. 1998).
Diniz & Rinard, "Lock Coarsening: Eliminating Lock Overhead in Automatically Parallelized Object-Based Programs", 29 pages, (Aug. 1996).
Harris et al., "Composable Memory Transactions", 13 pages, (Jun. 2005).
Harris & Fraser, "Language Support for Lightweight Transactions", 15 pages, (Oct. 2003).
Hindman & Grossman, "Strong Atomicity for Java Without Virtual-Machine Support", 18 pages, (printed Mar. 21, 2006).
Lev & Maessen, "Towards a Safer Interaction with Transactional Memory by Tracking Visibility", 8 pages, (Oct. 2005).
Ringenburg & Grossman, "AtomCaml: First-Class Atomicity via Rollback", 13 pages, (Sep. 2005).
Shinnar et al, Microsoft Research Technical Report "Integrating Support for Undo with Exception Handling", 13 pages, (Dec. 2004).
U.S. Appl. No. 11/192,784, filed Jul. 29, 2005, Harris.
Agrawal et al., "An interprocedural framework for placement of asynchronous I/O operations," UMD Technical Report CS-TR-3563, 1998, <http://www.ib.umd.edu/drum/bitstream/1903/778/2/CS-TR-3563.pdf,> retrieved Feb. 24, 2010, pp. 1-25.
Agrawal et al., "Interprocedural partial redundancy elimination and its application to distributed memory compilation," Proceedings of the ACM SIGPLAN 1995 Conference on Programming Language Design and Implementation, 1995, pp. 258-269.
First Office Action, corresponding Chile Patent Application No. 3405-2006, received Dec. 22, 2008, 5 pages.
Partial English translation of First Office Action, corresponding Chile Patent Application No. 3405-2006, received Dec. 22, 2008, 1 page.
Second Office Action, corresponding Chile Patent Application No. 3405-2006, received Nov. 19, 2009, 8 pages.
Partial English translation of Second Office Action, corresponding Chile Patent Application No. 3405-2006, received Nov. 19, 2009, 6 pages.
Adl-Tabatabai et al., "Compiler and Runtime Support for Efficient Software Transactional Memory," Proceedings of the 2006 ACM SIGPLAN Conference on Programming Language Design and Implementation, 2006, pp. 26-36.
Harris et al., "Optimizing Memory Transactions," PLDI '06, Ottawa, Ontario, Canada, Jun. 11-14, 2006, 12 pages.
Ananian et al., "Efficient Object-Based Software Transactions," Proceedings of the 2005 ACM OOPSLA Workshop on Synchronization and Concurrency in Object-Oriented Langues, SCOOL '05, Oct. 16, 2005, pp. 65-74.
European Search Report (Supplementary), EPC Patent Application No. 06838476.7, Mar. 11, 2011, 14 pages.
Hammond et al., "Programming with Transactional Coherence and Consistency," ASPLOS Proceedings, International Conference on Architectural Support for Programming Languages and Operating Systems, Oct. 9, 2004, pp. 1-13.
Notice of Rejection, Japan Patent Application No. 2008-544369, 17 pages, May 6, 2011 (English translation).
Notice of Preliminary Rejection, corresponding Korean Application No. 10-2008- 7011218, Jun. 24, 2013, 4 pages (with English translation).
Office Action, corresponding Mexico Patent Application No. MX/a/2008/005955, Feb. 15, 2011, 6 pages (with partial English translation).
First Office Action, corresponding Australia Patent Application No. 2006322227, received Dec. 1, 2010, 2 pages.
Second Office Action, corresponding Australia Patent Application No. 2006322227, received Jul. 18, 2011, 2 pages.
First Office Action, corresponding Chinese Patent Application No. 200680045337.8, dated Jul. 14, 2011, 19 pages (with English translation).
Decision on Patent Grant, corresponding Russian Patent Application No. 2008122968, Apr. 29, 2011, 22 pages (with English translation).
U.S. Appl. No. 11/389,334, filed Mar. 23, 2006.
U.S. Appl. No. 11/390,549, filed Mar. 23, 2006.
Notice of Rejection, corresponding Japan Patent Application No. 2008-544369, 40 pages, Apr. 13, 2012 (with partial English translation).
Notice on the Second Office Action, corresponding China Patent Application 200680045337.8, 11 pages, Mar. 6, 2012 (with partial English translation).
Final Rejection Notice, corresponding Japan Application No. 2008-544369, 4 pages, Oct. 12, 2012 (with partial English Translation).

* cited by examiner

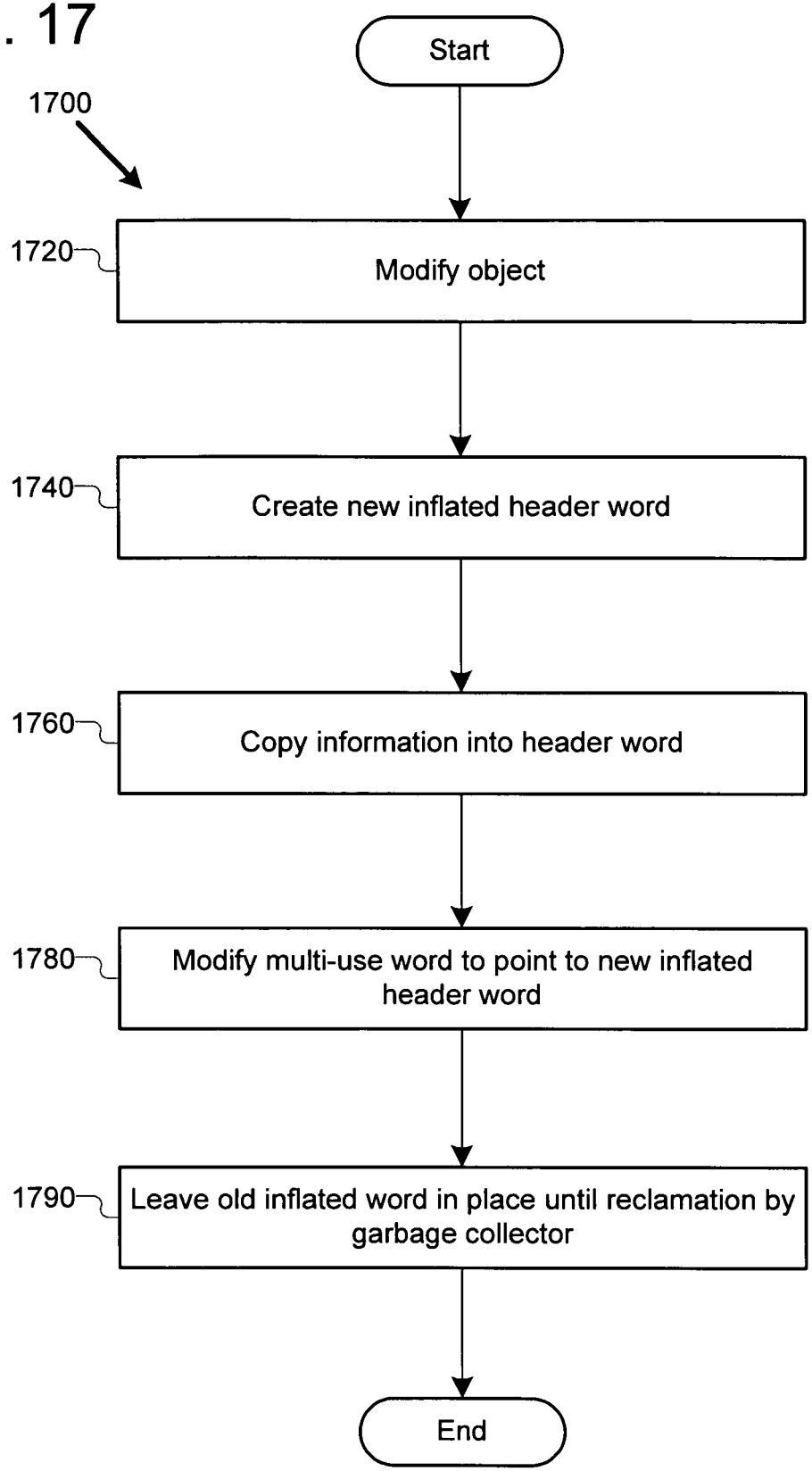

| Node1 | | |
|---|---|---|
| v100 | 0 | 0 |

| List |
|---|
| SCALAR_FIELD |
| Offset = 3 |
| Prev = 42 |

Fig. 20

Associative Table

| Slot number | Memory Address 2020 | Trans. # 2030 |
|---|---|---|
| 6962 | 200000 | 101 |
| 6963 | | |
| 6964 | | |
| ... | | |

2000
2010

Software 2680 Implementing Transactional
Memory Techniques

COMPILER SUPPORT FOR OPTIMIZING DECOMPOSED SOFTWARE TRANSACTIONAL MEMORY OPERATIONS

CROSS-REFERENCE TO RELATED APPLICATION

This application claims the benefit of U.S. Provisional Application No. 60/748,386, filed Dec. 7, 2005.

BACKGROUND

It is common for multiple threads of a multi-thread process to share common memory locations during concurrent execution. Consequently, two different threads of a multi-threaded process may read and update the same memory location accessible by the program. However, care must be taken to ensure that one thread does not modify a value of the shared memory location while the other thread is in the middle of a sequence of operations that depend on the value.

For example, suppose that a program is accessing the contents of two different software objects, wherein each object represents an amount of money in a different bank account. Initially, the amount of the first account is $10, stored at memory address A1, while the amount of the second account is $200, stored at memory address A2. A first thread of a banking program is coded to transfer $100 from A2 to A1 and a second thread is coded to calculate the total amount of funds in both accounts. The first thread may start by adding $100 to the contents of A1, updating it to $110, and then proceed to subtract $100 from the contents of A2, updating it to $100. However, if the second thread executes between these two operations, then the second thread may compute an incorrect total of $310 for both accounts, rather than the correct total of $210.

A software transactional memory ("STM") provides a programming abstraction through which a thread can safely perform a series of shared memory accesses, allowing the thread to complete its transaction without interference from another thread. Accordingly, transactional memories can be employed in software to ensure that the transaction including the exemplary addition and subtraction operations of the first thread is "atomic" as to the memory locations A1 and A2, and therefore the second thread will compute the correct total amount in both accounts.

However, existing approaches for implementing transactional memory in software suffer from performance problems. For example, in one existing approach, when a thread accesses a sequence of memory locations within a transaction, the thread maintains a separate list of the memory locations and values it wishes to read and update (i.e., write to) during the transaction and then, at the end of the transaction, the thread updates all of these values at the actual shared memory locations. If, during the transaction, the thread wants to re-read or re-write to any memory location in its list, the thread must search for the memory location's entry in the list to access the entry, which is a slow proposition programmatically. Accordingly, this indirect method of implementing a transactional memory in software suffers from poor performance.

Additionally, existing approaches to implementing transactional memory in software introduce substantial overhead, including unnecessary calls to transactional memory and record-keeping instructions, causing execution of programs to suffer, especially if these instructions perform in an inefficient manner. Additionally, record-keeping activities inherent in some transactional memory schemes do not effectively limit the creation and maintenance of the records they create, which can waste memory, as well as disk space and other system resources.

SUMMARY

A software transactional memory system is described. The system and techniques described herein utilize decomposed software transactional memory instructions as well as runtime optimizations to achieve efficient performance. A compiler is described which utilized knowledge of decomposed instruction semantics to perform optimizations which would be unavailable on traditional word-based software transactional memory systems. The compiler additionally performs high-level optimizations on STM code. Some of these optimizations are performed in order to take advantage of lower-level optimizations. These high-level optimizations include removal of unnecessary read-to-update upgrades, movement of STM operations around procedure calls, and removal of unnecessary operations on newly-allocated objects. Additionally, STM code is optimized to provide strong atomicity for memory accesses written outside of transactions. Multi-use header words for objects during runtime are extended to provide software transactional memory words which allow for per-object housekeeping, as well as fast snapshots which illustrate changes to objects. At runtime unnecessary growth of software transactional memory logs is avoided by filtering entries to the logs using an associative table during execution. Finally, at runtime, a garbage collector performs compaction of STM logs in addition to other garbage collection processes.

In one example, a method of compiling a program which includes software transactional memory blocks is described. The method comprises optimizing the program to create an optimized program containing software transactional memory instructions and compiling the optimized program.

In another example, a compiler system for compiling a program containing software transactional memory blocks is described. The system comprises an optimization module configured to optimize an intermediate representation for the source code, the intermediate representation comprising, at least in part, decomposed software transactional memory instructions. The representations of decomposed software transactional memory instructions are optimized at least in part according to software transactional memory optimization rules.

In yet another example, computer-readable media are described which contain instructions which, when executed by a computer, cause the computer to perform a method for optimizing a program comprising software transactional memory instructions. The method comprises receiving an intermediate representation of the program which includes representations of the software transactional memory instructions and applying optimization rules specific to software transactional memory instructions in order to optimize the representations of the software transactional memory instructions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

BRIEF DESCRIPTION OF THE DRAWINGS

FIG. 17 is a flowchart illustrating an example process of the runtime environment of FIG. 6 for modifying the snapshot of an object using an inflated header word.

FIG. 20 is a block diagram illustrating an example associative table used in the runtime environment of FIG. 6 for log filtering.

DETAILED DESCRIPTION

Figure 1:
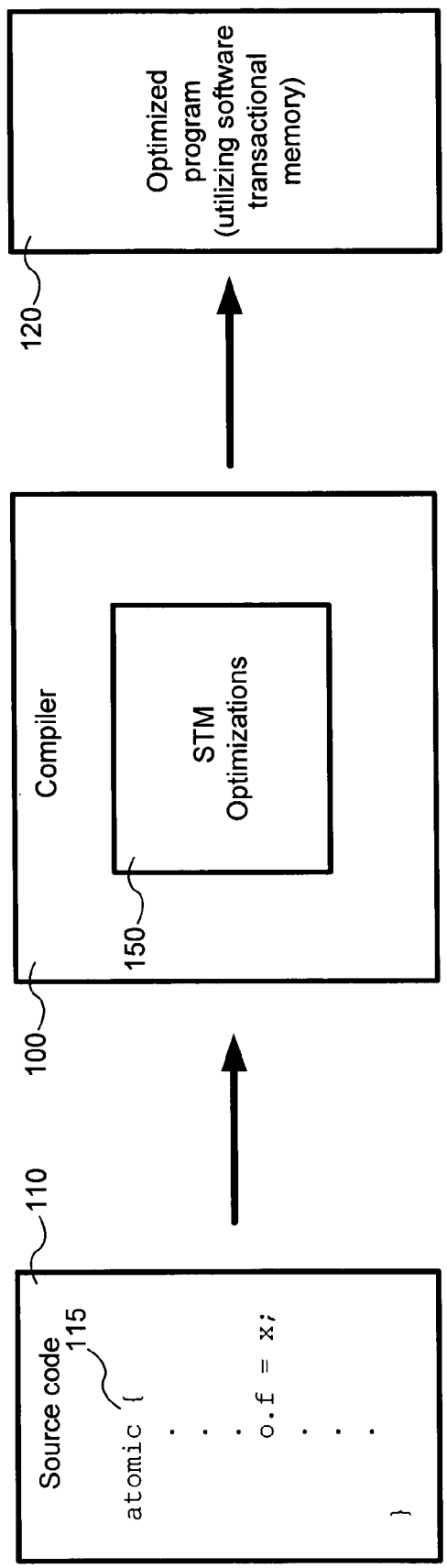
FIG. 1 is a block diagram of a compiler used to compile source code comprising atomic memory transaction blocks.

The examples illustrated herein describe examples of software and hardware-based transactional memory systems, as well as performance improvements upon those systems. In particular, the implementation examples below describe: decomposed software transaction operations; the use of STM primitives in compiler intermediate representation ("IR") to allow for code optimizations (which term is explained below), compiler improvements which act to improve performance on these primitives, runtime log filtering using associative tables, and efficient runtime per-object operations. While the descriptions provided herein are provided as optimizations of a particular software transactional memory implementation, it will be recognized that techniques and systems described herein can operate on various implementations and do not necessarily imply any limitation on implementation, performance, or requirements of the techniques described herein.

1. Examples of Software Transactional Memory System

Atomic blocks provide a promising simplification to the problem of writing concurrent programs. In the systems described herein, a code block is marked atomic and the compiler and runtime system provide that operations within the block, including function calls, appear atomic. The programmer no longer needs to worry about manual locking, low-level race conditions, or deadlocks. Atomic blocks can also provide exception recovery, whereby a block's side effects are rolled back if an exception terminates it. This is valuable even in a single-threaded application: error handling code is often difficult to write and to test. Implementations of atomic blocks scale to large multi-processor machines because they are parallelism preserving: atomic blocks can execute concurrently so long as a location being updated in one block is not being accessed in any of the others. This preserves the kind of sharing allowed in a conventional data cache.

The techniques described herein are made with reference to an STM implementation that is tightly integrated with the compiler and runtime system. One feature of the implementation is that it is a direct-update STM. This allows objects to be updated directly in the heap rather than working on private shadow copies of objects, or via extra levels of indirection between an object reference and the current object contents. This is more efficient for transactions that commit successfully.

The systems and techniques described herein utilize a feature of the implementation which provides a decomposed STM interface. For instance, a transactional store obj.field=42 is split into steps that (a) record that obj is being updated by the current thread, (b) log the old value that field held, and (c) store the new value 42 into the field. This new design allows classical optimizations to be provided to the transaction operations. For example, the three steps in our example are handled separately by the compiler and (a) and (b) can often be hoisted from a loop. In the techniques described herein, the decomposed STM interface is made more efficient through the use of a compiler with particular knowledge of the STM interface and semantics and which can perform optimizations which are configured to act specifically on this interface.

In another example, the systems and techniques described herein illustrate efficiencies in the described STM implementation through efficient per-object operations which utilize integrated transactional versioning. These implementations use integration of transactional versioning with an existing object header word. This is different than other STM systems, as these systems either use external tables of versioning records, additional header words, or levels of indirection between object references and current object contents. These approaches cause poor cache locality or increase space usage. The implementation described herein utilizes an inflated header word, along with efficient snapshot instructions which allow for quick verification of object modifications during transactional commits.

Further, runtime log filtering is described. The filtering is useful because not all unnecessary STM operations can be identified statically at compile-time.

In one implementation, examples described herein are implemented in Bartok, an optimizing ahead-of-time research compiler and runtime system for Common Intermediate Language (CIL) programs with performance competitive to the Microsoft .NET Platform. The runtime system can be implemented in CIL, including the garbage collectors and the new STM.

1.1 Semantics

The techniques described herein focus on the performance of atomic blocks. Various implementations may differ on exact semantics, including the interaction of atomic blocks with locking code and combining I/O operations with atomic blocks while continuing to utilize these techniques.

1.2 Design Assumptions

In the examples described herein some assumptions are made about how atomic blocks will be used. These do not necessarily represent limitations on the implementations described herein, but instead serve to facilitate description.

One assumption is that most transactions commit successfully. This is a reasonable assumption because, first, the use of a parallelism-preserving STM means that transactions will not abort 'spontaneously' or because of conflicts that the programmer cannot understand (in alternative implementations, conflicts are detected based on hash values, which can collide unexpectedly). It is assumed as part of this that a programmer already has a strong incentive to avoid contention because of the cost of excessive data movement between caches. Techniques such as handing high-contention operations off to work queues managed by a single thread remain valuable.

A second assumption is that reads outnumber updates in atomic blocks. This assumption is borne out by observations of current programs, and attempts to develop transactional versions of them. This emphasizes the benefit of keeping the overhead of transactional reads particularly low: reads involve merely logging the address of the object being read and the contents of its header word.

A final assumption is that transaction size should not be bounded. This retains compositionality while suggesting that the STM implementation needs to scale well as the length of transactions grows. In this design, the space overhead grows with the volume of objects accessed in the transaction, not the number of accesses made. In the examples described herein, transactions are referred to informally as "short" or "long." Short transactions are likely to run without requiring any memory allocation by the STM. Long transactions are those whose execution is likely to span GC cycles (e.g., evaluating one of the LISP benchmarks in a version of the SPEC95 benchmark xlisp that has been translated to C#).

1.3 Word-based STM Example

One conventional interface for word-based STM provides the following two sets of operations:

```
void TMStart( )
void TMAbort( )
bool TMCommit( )
bool TMIsValid( )
word TMRead(addr addr)
void TMWrite(addr addr, word value)
```

The first set is used to manage transactions: TMStart starts a transaction in the current thread. TMAbort aborts the current thread's transaction. TMCommit attempts to commit the current thread's transaction. If the transaction cannot commit (for example, in one implementation, because a concurrent transaction has updated one of the locations it accessed) then TMCommit returns false and the current transaction is discarded. Otherwise, TMCommit returns true and any updates which were made during the transaction are atomically propagated to the shared heap. TMIsValid returns true if and only if the current thread's transaction could commit at the point of the call. The second set of operations performs data accesses: TMRead returns the current value of the specified location, or the most recent value written by TMWrite in the current transaction.

In one implementation of the techniques described herein, the process of programming directly with STM is automated by having a compiler rewrite memory accesses in atomic blocks to use STM operations, and having it generate specialized versions of called methods to ensure that TMRead and TMwrite are used for all memory accesses made in an atomic block.

The design described above suffers from a number of problems which limit its applicability. The following code examples illustrate this. Example 1a, shown below iterates through the elements of a linked list between sentinel nodes this.Head and this.Tail. It sums Value fields of the nodes and stores the result in this.Sum. Example 1b illustrates one example of automatically placing calls to TMRead and TMWrite for all memory accesses.

However, several performance problems can occur with this word-based system. First, many implementations of TMRead and TMwrite use transaction logs that are searched on every TMRead and TMwrite operation. TMRead must see earlier stores by the same transaction, so it searches the transaction log that holds tentative updates. Such searching may not scale to support large transactions. The performance depends on the length of the transaction log and the effectiveness of auxiliary index structures. Second, opaque calls to an STM library hinder optimization (e.g. it is no longer possible to hoist reading this.Tail from the loop because the behavior of TMRead is unknown to the compiler). Finally, monolithic TM operations cause repeated work. For instance, repeated searches when accessing a field in a loop.

1.4 Decomposed Direct-Access STM

A decomposed direct-access STM implementation, which is used in the examples provided herein, addresses these problems. The first problem is addressed by designing systems so that a transaction can perform read and write operations directly to the heap, letting a read naturally see a preceding transactional store without any searching. Logs are still needed for rolling back a transaction that aborts and for tracking versioning information for the locations accessed. For short transactions, these logs are append-only. Thus, searching is not required, regardless of transaction size.

The second problem is addressed by introducing TM operations early during compilation and extending the subsequent analysis and optimization phases to be aware of their semantics. Finally, the third problem is addressed by decomposing the monolithic TM operations into separate steps so that repeated work can be avoided. For instance, management of transaction logs is separated from actual data accesses, often allowing log management to be hoisted from loops.

This interface decomposes the transactional memory operations into four sets:

```
tm_mgr DTMGetTMMgr( )
void DTMStart(tm_mgr tx)
void DTMAbort(tm_mgr tx)
bool DTMCommit(tm_mgr tx)
bool DTMIsValid(tm_mgr tx)
void DTMOpenForRead(tm_mgr tx, object obj)
void DTMOpenForUpdate(tm_mgr tx, object obj)
object DTMAddrToSurrogate(tm_mgr tx, addr addr)
void DTMLogFieldStore(tm_mgr tx, object obj, int offset)
void DTMLogAddrStore(tm_mgr tx, addr obj)
```

The first two sets are straightforward, providing DTMGetTM-Mgr to get the current thread's transaction manager, and then providing the usual transaction management operations. The third set provides contention detection: DTMOpenForRead and DTMOpenForUpdate indicate that the specified object will be accessed in read-only mode or that it may subsequently be updated. Access to static fields is mediated by surrogate objects that hold versioning information on their behalf: DTMAddrToSurrogate maps an address to its surrogate. The last set maintains an undo log, needed to roll back updates on abort. DTMLogFieldStore deals with stores to object fields and DTMLogAddrStore deals with stores to any address.

Calls to these operations must be correctly sequenced to provide atomicity. There are three rules: (a) a location must be open for read when it is read, (b) a location must be open for update when it is updated or a store logged for it, (c) a location's old value must have been logged before it is updated. In practice this means that a call to TMRead for a field of an object is split into a sequence of DTMGetTMMgr, DTMOpenForRead, and then a field read. TMwrite is DTMGetTMMgr, DTMOpenForUpdate, DTMLogAddrStore, and then a field write. A call to TMRead for a static field is split into a sequence of DTMGetTMMgr,DTMAddrToSurrogate,DTMOpenForRead, and then a static field read. TMWrite is DTMGetTMMgr, DTMAddrToSurrogate, DTMOpenForUpdate,DTMLogAddrStore, and a static field write.

The following examples demonstrate an example of the use of decomposed direct-access STM. The code in Example 1 iterates through the elements of a linked list between sentinel nodes this.Head and this.Tail. It sums the Value fields of the nodes and stores the result in this.Sum. Example 2 shows how Sum could be implemented using the decomposed direct-access STM.

Example 1a

```
public int Sum( ) {
    Node n = this.Head;
    int t = 0;
    do {
        t += n.Value;
        if (n==this.Tail)
        {
            this.Sum = t;
            return t;
        }
        n = n.Next;
    } while (true)
}
```

Example 1b

```
public int Sum( ) {
    Node n = TMRead(&this.Head);
    int t = 0;
    do {
        t += TMRead(&n.Value);
        if (n==TMRead(&this.Tail))
        {
            TMWrite(&this.Sum, t);
            return t;
        }
        n = TMRead(&n.Next);
    } while (true)
}
```

Example 2

```
public int Sum( ) {
    tm_mgr tx = DTMGetTMMgr( );
    DTMOpenForRead(tx, this);
    Node n = this.head;
    int t = 0;
    do {
        DTMOpenForRead(tx, n);
        t += n.Value;
        DTMOpenForRead(tx, this);
        if (n==this.Tail) {
            DTMOpenForUpdate(tx, this);
            DTMLogFieldStore(tx, this, offsetof(List.Sum));
            this.Sum = t;
            return t;
        }
        DTMOpenForRead(tx, n);
        n = n.Next;
    } while (true)
}
```

2. Compiler Optimizations

Section 2 describes the optimization of decomposed STM operations utilizing a compiler which is configured with knowledge of the STM operations. It should be noted that, as used in this application, the terms "optimize," "optimized," "optimization" and the like are terms of art that generally refer to improvement without reference to any particular degree of improvement. Thus, in various scenarios, while an "optimization" may improve one or more aspects of the performance of a system or technique, it does not necessarily require that every aspect of the system or technique be improved. Additionally, in various situations, "optimization" does not necessarily imply improvement of any aspect to any particular minimum or maximum degree. Furthermore, while an "optimized" system or technique may show performance improvement in one or more areas, it may likewise show a decrease in performance in other areas. Finally, while an "optimization" may improve performance of a system or technique in some situations, it may be possible that it reduces the performance in other situations. In the particular circumstances described below, while optimizations will result in the removal of redundant or superfluous STM instructions or log writes, possibly providing increased performance, these optimizations should not imply that every possible redundant or superfluous instructions will be removed.

FIG. 1 is a block diagram illustrating one example of a compiler 100, used to create an optimized program 120 utilizing software transactional memory. In the illustrated example, the compiler 100 takes as input source code 110. As illustrated, the source code 110 contains one or more atomic blocks 115. As mentioned above, in one implementation, inclusion of these atomic blocks avoids additional programming for a programmer wishing to utilize STM; these blocks are modified by the compiler to include decomposed STM instructions, which are then optimized. While FIG. 1 illustrates a single piece of source code, it should be recognized that this is merely for simplicity of illustration; the techniques and systems described herein apply as well to multiple source code files which are compiled together, as well as source code which uses already-compiled code. Additionally, in various implementations different code languages are used, including C++, C#, Java, C, and others; as well, in various implementations interpreted languages may be optimized as well. In the illustrated example, this optimization is provided by STM optimizations 150, which is integrated in the compiler; additional details of this integration are discussed below. After compilation and optimization, an optimized program 120 is produced which utilizes software transactional memory. Additional details of runtime operations of such an optimized program are described in greater detail below. Additionally, while the illustrated implementation shows compilation into an executable file before execution, alternative implementations of the techniques described herein may compile and optimize programs immediately before or concurrently with execution.

Figure 2:
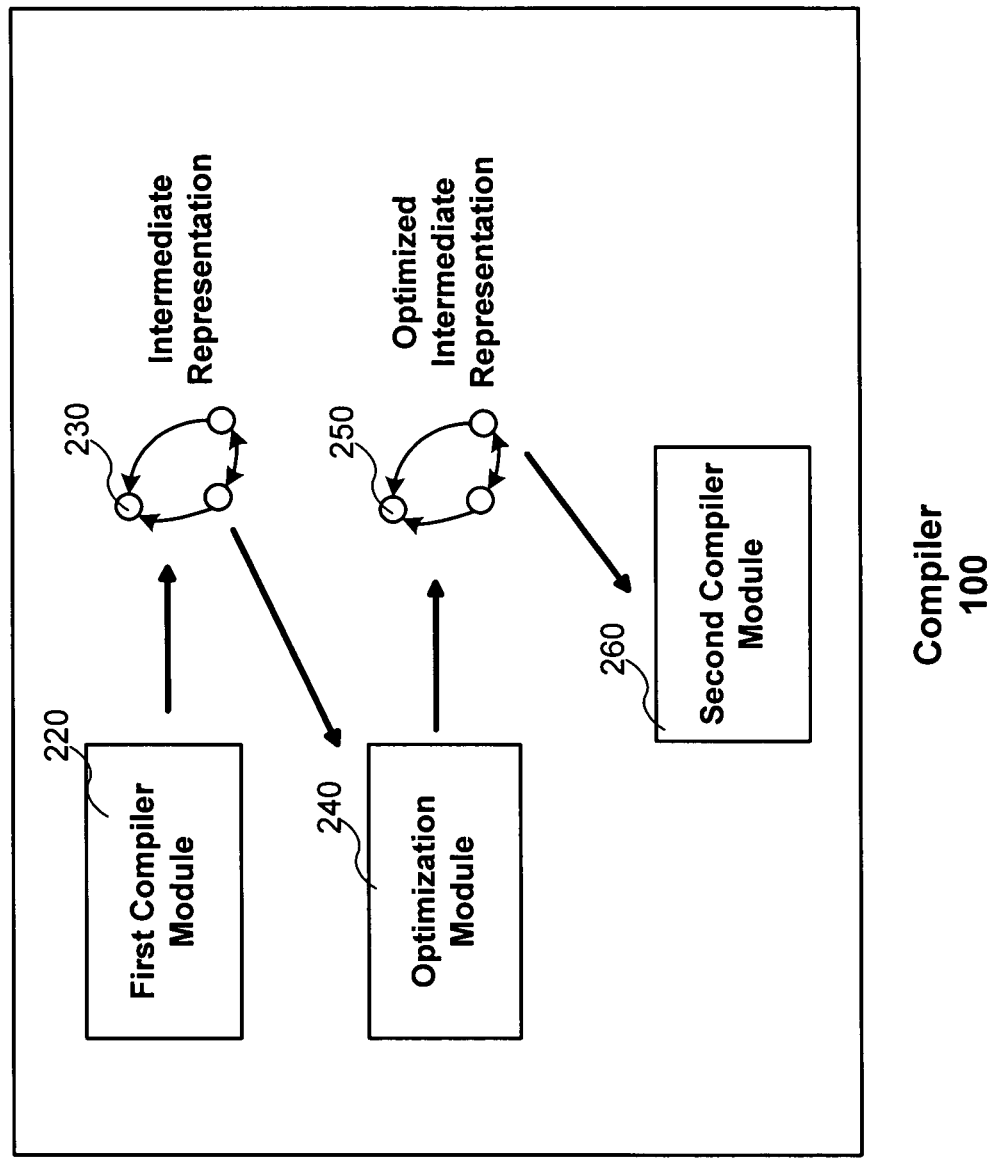
FIG. 2 is a block diagram of components of the compiler of FIG. 1.

FIG. 2 is a block diagram illustrating example components of the compiler 100 of FIG. 1. FIG. 2 illustrates an example operation path through the compiler. While FIG. 2 illustrates particular modules separately, it should be recognized that, in various implementations, the modules may be merged or divided in various combinations. The path begins with the first compiler module 220, which accepts the source code 110 and creates an intermediate representation 230 from it. In one implementation, this IR takes the form of a control-flow graph ("CFG"), which allows it to be easily manipulated by the optimizing techniques described herein.

Next, the IR 230 is modified by the optimization module 240 to create an optimized IR 250. In the operation of the optimization module 240, traditional compiler optimizations are extended with low-level and high-level STM-specific optimizations. Examples of such optimizations will be described in greater detail below. Finally, the optimized IR 250 is compiled by the second compiler module 260 into executable code, such as the optimized program 120 of FIG. 1.

Figure 3:
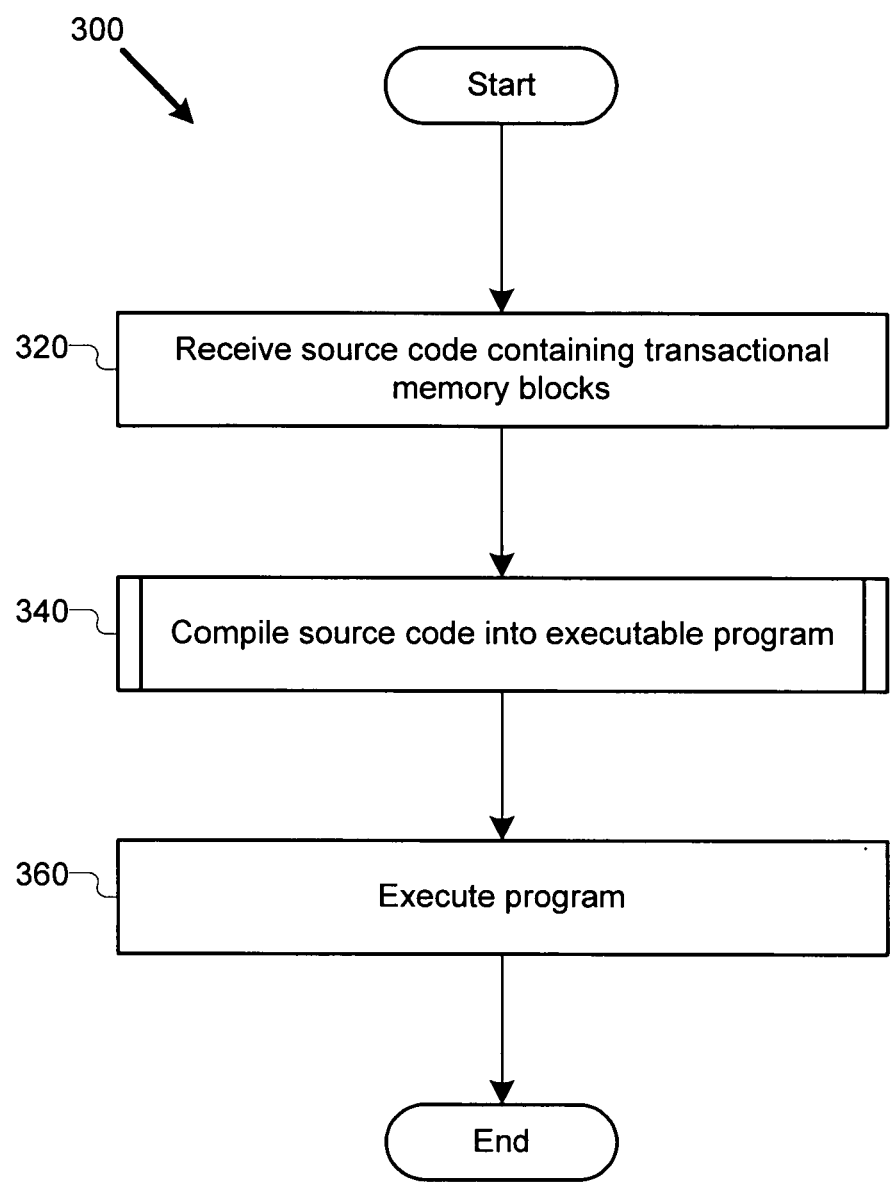
FIG. 3 is a flowchart illustrating an example process of compiling and executing a program using transactional memory.

FIG. 3 is a flowchart of an example process 300 for compiling and executing a program using STM. In various implementations, the illustrated process blocks may be merged, divided into sub-blocks, or omitted. The process starts at block 320, where source code containing transactional memory blocks (such at the atomic blocks of FIG. 1) is received. In an alternative implementation, the source code may not contain transactional memory blocks, but instead will comprise individual software transactional memory instructions, such as the word-based or decomposed instructions described above. Next, at block 340, this source code is compiled into an executable program. Specific examples of compilation are described in greater detail below. Finally, at block 360, the executable program is executed.

Figure 4:
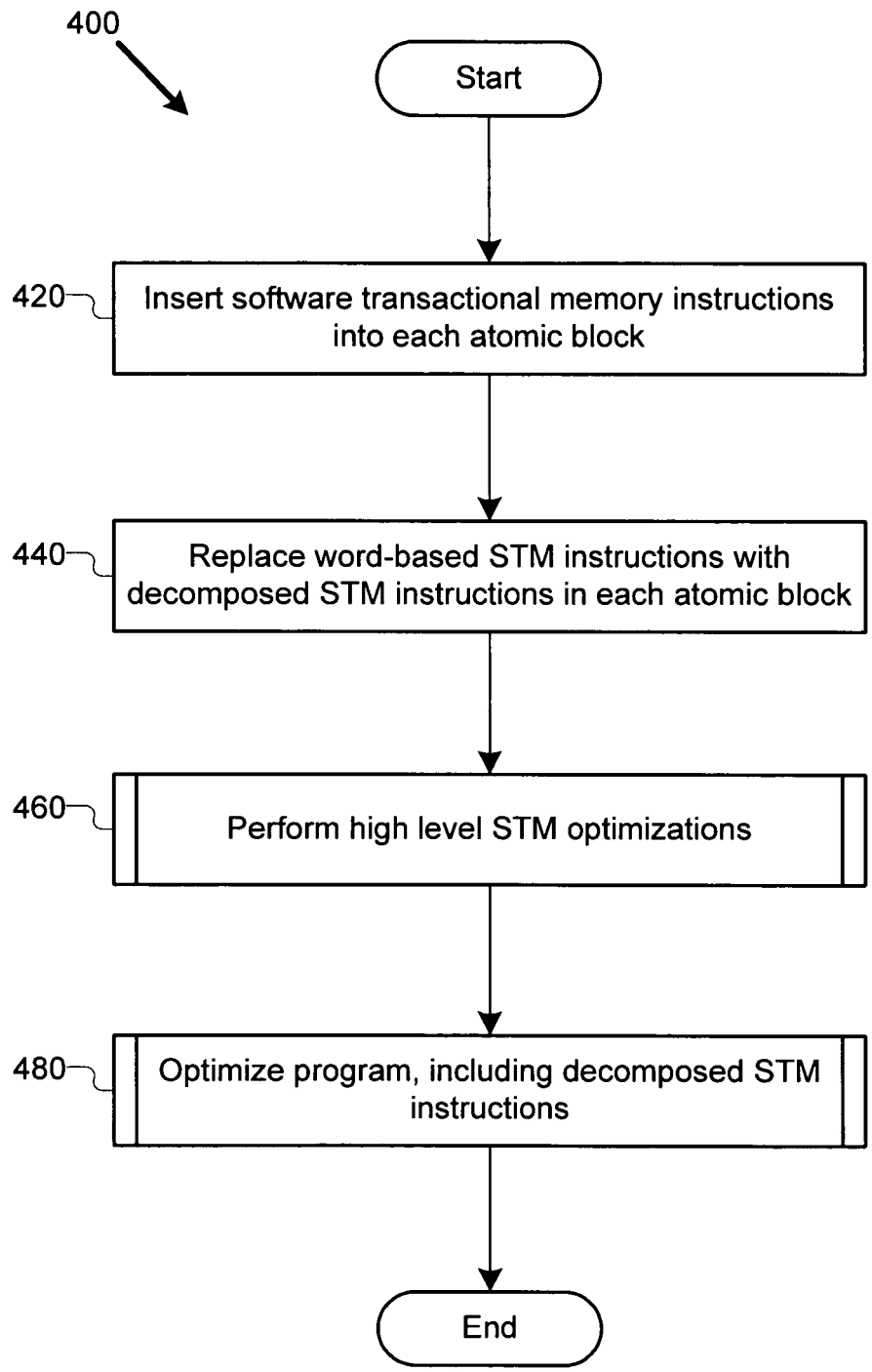
FIG. 4 is a flowchart illustrating an example process performed by the compiler of FIG. 1 for compiling a program with transactional memory.

FIG. 4 is a flowchart of an example process 400 for compiling source code which incorporates transactional memory blocks. Process 400 corresponds to block 340 of FIG. 3. In various implementations, the illustrated process blocks may be merged, divided into sub-blocks, or omitted. The process begins at block 420, where software transactional memory instructions are inserted into each atomic block by the compiler 100. In one implementation, this insertion is performed by inserting the proper word-based read and write STM instructions around every instance of a read or write within the block. In another implementation, if a programmer decides to insert his own STM instructions, the process of block 420 may be omitted.

Next, at block 440, word-based STM instructions are replaced by the compiler 100 with decomposed instructions. In one implementation, if the source code received by the compiler contains already-decomposed instructions, the process of block 440 is omitted. Additionally, in some implementations, the processes of blocks 420 and 440 in particular may be combined to insert decomposed STM instructions directly in response to receiving an atomic block. Example 2, above, illustrates what a piece of code might look like after the operation of the process of block 440.

In another implementation of the process of block 440, the compiler further reduces the cost of log management by decomposing log operations, allowing the amortization of the cost of log-management work across multiple operations. In particular in one implementation, DTMOpen* and DTMLog* operations start with a check that there is space in the current array. For DTMopenForRead, this is the only check that must be performed in the fast-path version of the code. To amortize the cost of these checks, the compiler utilizes a new operation, EnsureLogMemory, taking an integer that indicates how many slots to reserve in a given log. Specialized decomposed versions of the DTMOpen* and DTMLog* operations can thus assume that space exists. To reduce runtime bookkeeping, in one implementation, EnsureLogMemory operations are not additive: two successive operations reserve the maximum requested, not the total. For simplicity, one implementation does not place the specialized operations where reserved space would be required after a call or back edge. In another implementation, reservations are combined for all operations between calls within each basic block. In another, a backwards analysis is used to eagerly reserve space as early as possible, being forced to stop at all calls and loop headers. This has the advantage of combining more reservations but may introduce reservation operations on paths that do not require them.

At block 460, the compiler performs high level STM optimizations, including introduction of operations for strong atomicity, movement and removal of unnecessary STM operations, and removal of log operations for newly-allocated objects. This process is described in greater detail below. Finally, at block 480, the program is optimized, including the STM instructions. While the process of FIG. 4 illustrates high level optimizations followed by other optimizations in blocks 460 and 480 and does not illustrate repetition of the optimizations, in some implementations, the processes of FIGS. 460 and 480, or subprocesses thereof, may be performed in a different order than illustrated, and may be repeated. One reason for repetition is that certain optimizations may expose opportunities for other optimizations. Thus, it may be desirable to repeatedly perform optimizations to take advantage of opportunities as they may arise.

Figure 5:
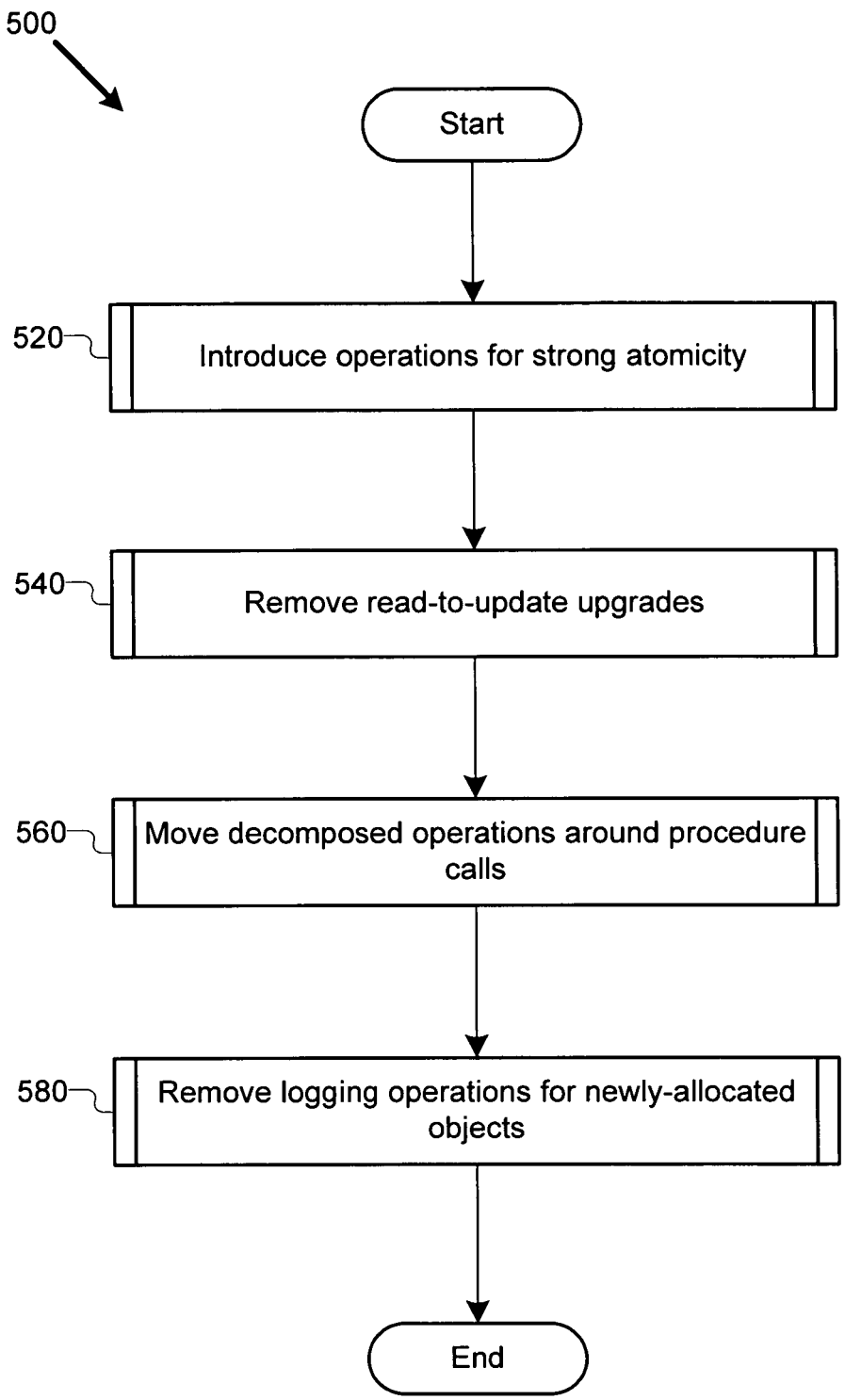
FIG. 5 is a flowchart illustrating an example process performed by the compiler of FIG. 1 for performing high level software transactional memory optimizations.

FIG. 5 is a flowchart of an example process 500 for performing high-level optimizations on STM instructions. Process 500 corresponds to block 460 of FIG. 4. In various implementations, the illustrated process blocks may be merged, divided into sub-blocks, or omitted. In one implementation, process 500 is performed before the compiler optimizations of process 600, described below, in order that operations added by the high-level optimizations can be further optimized by the compiler. The process begins at block 520, where the compiler introduces operations for strong atomicity. Next, at block 540, operations to open objects for read followed by operations to open the same objects for update are replaced with open-for-update operations, in order to allow for later removal of open operations during subsequent optimization. In one implementation, these open-for-read operations followed by open-for-update operations are called read-to-update upgrades; the process of block 540 removes these upgrades. Next, at block 560, decomposed STM operations are moved around procedure calls in order to provide for greater optimizations in the process of FIG. 6. Finally, at block 580, logging operations for objects which are newly-allocated in the transactions for which they are logged are removed to prevent needless log operation calls. Particular examples of each of these processes are described in greater detail below with respect to FIGS. 7-12.

2.1. Compiler Optimizations on Decomposed Code

Figure 6:
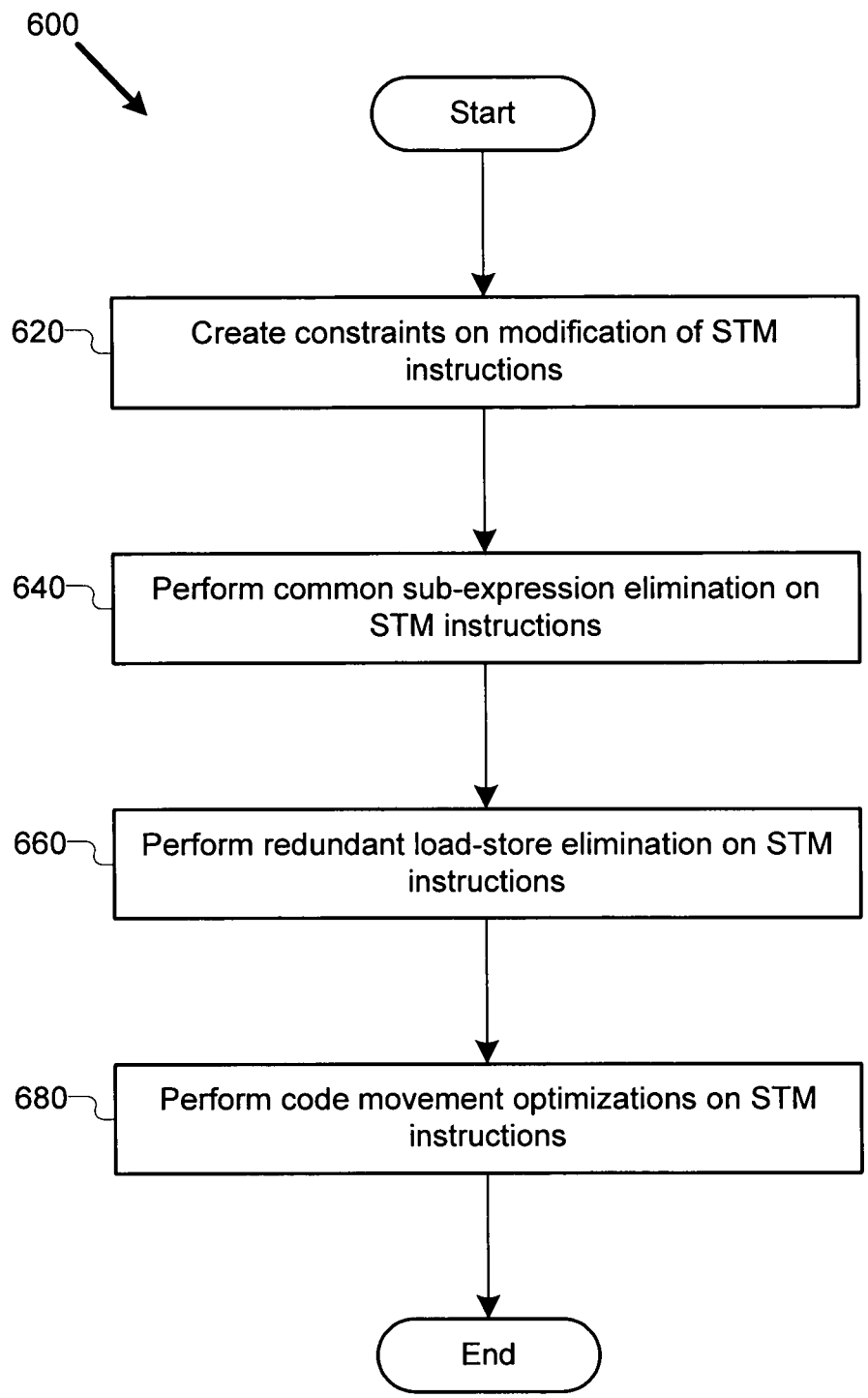
FIG. 6 is a flowchart illustrating an example process performed by the compiler of FIG. 1 for optimizing decomposed software transactional memory instructions during compilation.

FIG. 6 is a flowchart of an example process 600 for performing optimizations on STM instructions. Process 600 corresponds to block 480 of FIG. 4. In various implementations, the illustrated process blocks may be merged, divided into sub-blocks, or omitted. Additionally, while the illustrated implementation gives an example wherein each action is performed once, in alternative implementations, actions may be repeated. Thus, for example, the common sub-expression elimination action described below may be performed a second time after code motion optimizations have been performed. While FIG. 6 does not illustrate optimization of non-STM instructions, this is done for the sake of simplicity of the illustration, and does not demonstrate any limitation on the processes described herein.

The process begins at block 620, where constraints are created on the modification of STM instructions. In one implementation, these constraints are at least those for atomicity, which are based in the sequence of calls. Thus, there are three rules: (a) a location must be open for read when it is read, (b) a location must be open for update when it is updated or a store logged for it, (c) a location's old value must have been logged before it is updated.

These rules can be implemented using a number of methods. In one, the compiler keeps track of the constraints during compilation through various housekeeping measures. Because this can quickly complicate the compilation process, in another implementation, the CFG can be modified to prevent the constraints from being violated. One such method is to introduce data dependencies using dummy variables between the STM instructions that enforce a call order by making dummy output variables for instructions which become input variables for subsequent instructions. Thus, an IR which looks like the following (using generic instructions):

```
open_for_update (loc);
log_for_update (loc);
write (loc, val);
becomes:
dummy1 = open_for_update (loc);
dummy2 = log_for_update (loc, dummy1);
write (loc, val, dummy2);
```

Next, at block 640, Common Subexpression Elimination ("CSE") is performed on the STM instructions, followed by redundant load-store elimination on the instructions at block 660 and code movement optimization at block 680.

In one example, these optimizations can be performed on the DTMGetTMMgr operation because it is constant and thus provides opportunities for CSE. Similarly, because the DTMOpenForRead, DTMOpenForUpdate, DTMAddrToSurrogate, and DTMLog* operations are idempotent within a transaction, they are also eligible for CSE or code motion. One constraint on this optimization is that the code motion cannot, in one implementation, extend beyond transaction boundaries. In another implementation, CSE is extended to provide elimination for DTMopenForRead instructions which take place after DTMOpenForUpdate. This optimization can be performed because update access subsumes read access.

In other implementations, CSE can be performed on operations between nested transactions. Thus, in one example, a DTMopenForRead operation in a nested transaction is subsumed by DTMOpenForRead or DTMOpenForUpdate in an outer transaction and thus can be eliminated. In another, a DTMopenForUpdate in a nested transaction is subsumed by a DTMopenForUpdate in an outer transaction and is eliminated.

In another implementation, the DTMGetTMMgr operation can be implemented by fetching the current transaction manager for a thread from a per-thread Thread object (and creating the transaction manager if necessary). The Bartok compiler can thus also treat a GetCurrentThread instruction as a constant operation subject to code motion.

As an example, after performance of the above processes, the code of Example 2, is simplified to the following, more efficient code:

```
public int Sum( ) {
    tm_mgr tx = DTMGetTMMgr( );
    DTMOpenForRead(tx, this);
    Node n = this.head;
    int t = 0;
    do {
        DTMOpenForRead(tx, n);
        t += n.Value;
        if (n==this.Tail) {
            DTMOpenForUpdate(tx, this);
            DTMLogFieldStore(tx, this, offsetof(List.Sum));
            this.Sum = t;
            return t;
        }
        n = n.Next;
    } while (true)
}
```

2.2. High-Level STM Optimizations 2.2.1 Implementing Strong Atomicity

The techniques described above can be used to build "atomic" blocks in which the memory accesses in one atomic block occur indivisibly with respect to the accesses in a second atomic block. However, an "atomic" block executed by one thread may not appear to execute indivisibly when a second thread performs a conflicting memory access without using an "atomic" block. Designs with this feature can be said to provide "weak atomicity".

One implementation of the techniques described herein concerns how to provide "strong atomicity," in which atomic blocks appear to execute indivisibly with respect to all memory accesses, not just those made in other atomic blocks. A basic implementation extends the STM described above with support for strong atomicity by (a) identifying all accesses to shared memory that occur outside any atomic block, (b) rewriting these as short atomic blocks.

For instance, suppose that a program reads from the contents of the field "o1.x" and stores the result in the field "o2.x". This would originally be represented by two instructions in the compiler's intermediate representation (IR):

```
L1:
    t1 = getfield<x>(o1)
L2:
    putfield<x>(o2, t1)
```

The basic implementation expands these to code such as:

```
L1:
    DTMStart(tm)
    DTMOpenForRead(tm, o1)
    t1 = getfield<x>(o1)
    DTMCommit(tm) // C1
L2:
    DTMStart(tm)
    DTMOpenForUpdate(tm, o2)
    logfield<x>(o2)
    putfield<x>(o2, t1)
    DTMCommit(tm) // C2
```

(In some implementations, actual code written is more complex because it must also include code paths to re-execute the transactions from L1 or L2 if there is contention during the commit operations C1 or C2. The exact details of that code will vary depending on how the STM operations are represented in the IR.)

The basic form will provide strong atomicity, but it will perform poorly because of the additional cost of the transaction start, transaction commit, open-for-read, open-for-update, and log operations above the cost of the original field accesses.

To increase efficiency while still providing a strong atomicity implementation, one implementation of the techniques described herein uses specialized IR operations to accelerate the performance of short transactions that access only a single memory location.

There are two cases to consider: transactions that read from a single location, and transactions that update a single location (including transactions that perform read-modify-write operations to a single location). Both cases involve checking of an STM Word, which is described in greater detail below. The first case is represented in an extended IR by (a) reading the STM Word for the object involved, (b) reading the field, (c) re-reading the STM Word, and checking that the value read matched that in (a) and that the value does not indicate that there was a concurrent conflicting access. The second case is represented in an extended IR by (a) updating the STM Word for the object involved, indicating that it is subject to a non-transactional update, (b) updating the field, (c) updating the STM Word once more, indicating that it is no longer subject to a non-transactional update.

Thus, the IR for an Example Looks as Follows:

```
L1:
    s1 = openoneobjforread(o1)
    t1 = getfield<x>(o1)
    if (!checkoneobj(o1, s1)) goto L1
L2:
    s2 = openoneobjforupdate(o2)
    putfield<x>(o2, t1)
    commitoneobj(o2, s2)
```

This implementation involves two distinctions with the STM implementation described above. The first is that, unlike the STM implementation above, temporary storage is found in local variables rather than in transaction logs. This means the variables may be allocated in processor registers to make it fast to access them. The second distinction is that the transaction starting at L2 cannot abort and so it is unnecessary to log the value that is overwritten in "o2.x".

In yet another strong atomicity implementation, the compiler performs further optimization to limit the number of fields that must be expanded in this way. In one example, the compiler performs a type-based analysis to identify all fields that may be written in an atomic block. Any other fields, which are guaranteed to never be subject to access in atomic blocks, may be accessed directly, and thus will not require strong atomicity operations to be inserted around them.

Figure 7:
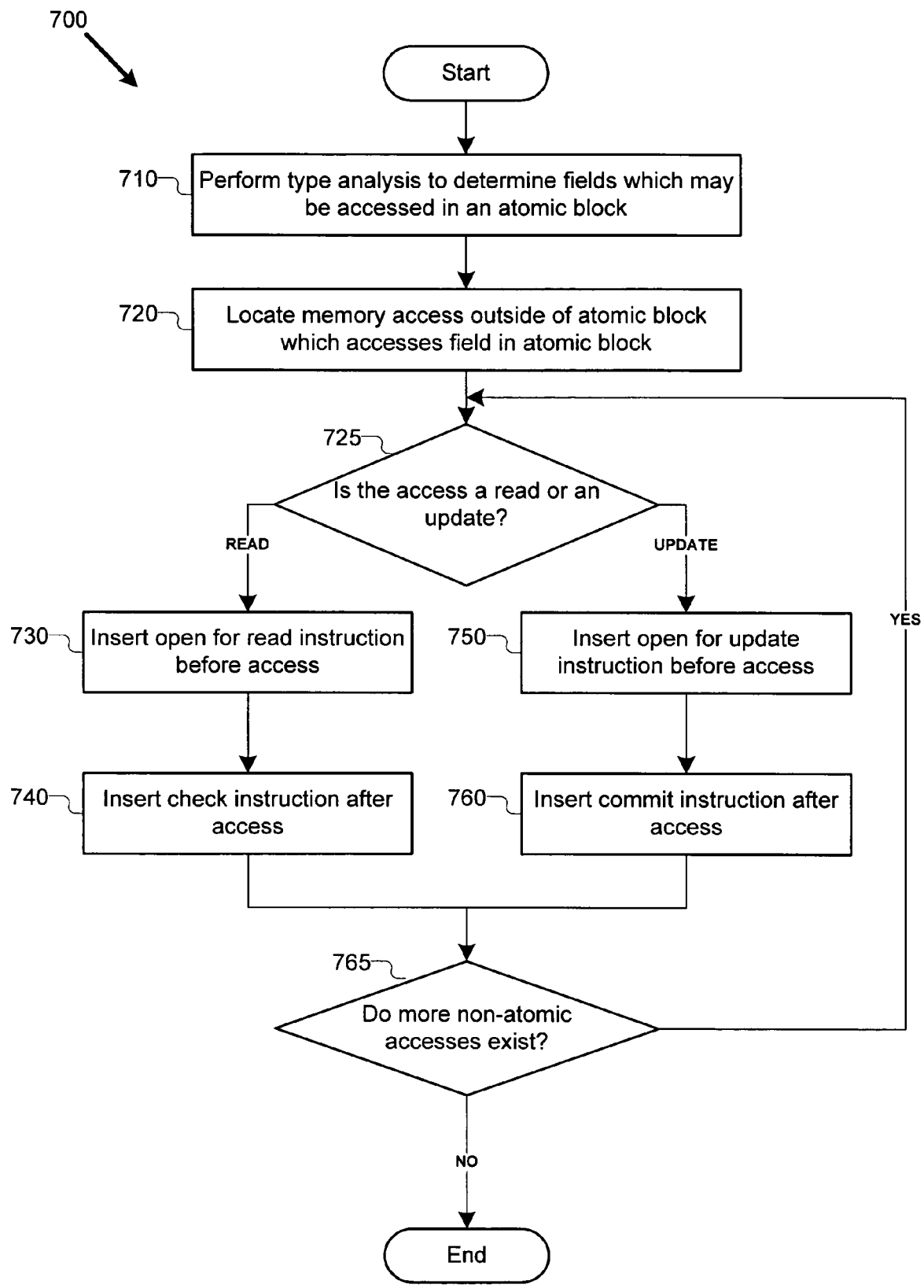
FIG. 7 is a flowchart illustrating an example process performed by the compiler of FIG. 1 for introducing operations for implementing strong atomicity.

FIG. 7 is a flowchart of an example process 700 for introducing operations to implement strong atomicity. Process 700 corresponds to block 520 of FIG. 5. In various implementations, the illustrated process blocks may be merged, divided into sub-blocks, or omitted. The process begins at block 710, where a type analysis is performed to determine fields which may be accessed in an atomic block. As described above, in one implementation, this is performed to avoid needless insertion of strong atomicity operations against memory accesses which cannot cause a conflict. Next, at block 720, a memory access in the program is located which can access a field contained in an atomic block, using the fields determined in block 710. In an alternative implementation, the process of block 710 may be omitted, and the process of block 720 can locate every memory access outside of atomic blocks for insertion of strong atomicity operations.

Next, the process continues to decision block 725, where the compiler determines if the access located in block 720 is a read or an update access. If the access is a read, the process continues to block 730, where an open-for-read instruction is inserted before the access. In one implementation, this instruction is configured to block until it is able to receive an STM word and thus ensure that the memory access can properly read the field being accessed. In another, the operation does not block, but a loop is created after the memory access if the memory access does not check out. Next, at block 740, a check instruction is inserted after the memory access to ensure that, over the course of the read access, the STM word did not indicate a change to the field being read. In the implementation provided above, this is done by receiving an STM word at block 730 and passing the STM word to the check operation at block 740; this also creates a data dependency which prevents code optimization from re-ordering the order of the strong atomicity operations.

If, however, block 725 determines the access is an update, the process continues to block 750, where an open-for-update instruction is inserted before the access. In one implementation, this instruction is configured to modify an STM word from the object being accessed, in order to prevent other accesses, thus providing strong atomicity. Next, at block 760, a commit instruction is inserted after the memory access to commit the update performed at the memory access. In one implementation, a version number for the object accessed is changed. In another, it is not. Next, at decision block, 765, the compiler determines if there are additional non-atomic memory accesses. If so, the process repeats. If not, the process ends.

2.2.2 Removing Read-to-Update Upgrades

Another high-level optimization performed by various implementations of the STM compiler is to avoid the unnecessary logging which occurs when a DTMOpenForRead operation is followed by a DTMOpenForUpdate operation. One design assumption inherent in the techniques described herein is that reads are more common than writes, which is why these techniques use separate DTMOpenForUpdate and DTMOpenForRead operations; the open-for-read instruction is able to complete more quickly. However, sometimes objects are read from and then written to (the canonical example being "obj.field++"). In this case the IR with open operations will look something like

```
DTMOpenForRead(obj);
t = obj.field;
t = t+1;
DTMOpenForUpdate(obj);
DTMLogFieldStore(obj, offsetof(obj.field));
obj.field = t;
```

If the program reaches the open-for-read point, it can be seen that it will reach the open-for-update point, ignoring exceptions for the moment. Since an open-for-update subsumes open-for-read on the same object, the open-for-read operation is wasted. This is known in one implementation as a read-to-update upgrade. It would be more efficient to simply perform the open-for-update operation earlier:

```
DTMOpenForUpdate(obj);
t = obj.field;
t = t+1;
DTMLogFieldStore(obj, offsetof(obj.field));
obj.field = t;
```

Thus, in one implementation, the compiler removes read-to-update upgrades as they are found. Generally, this can be handled by the compiler within a basic block by a straight-forward dataflow analysis, upgrading DTMopenForRead operations if followed by a DTMOpenForUpdate. In another general case, DTMOpenForUpdate operations are simply inserted at the beginning of all basic blocks from which all nonexception paths perform the same DTMopenForUpdate (without intervening stores to the variables involved). CSE then attempts to eliminate the extra DTMOpenForUpdate operations as well as any subsequent DTMOpenForRead operations on the same object.

Figure 8:
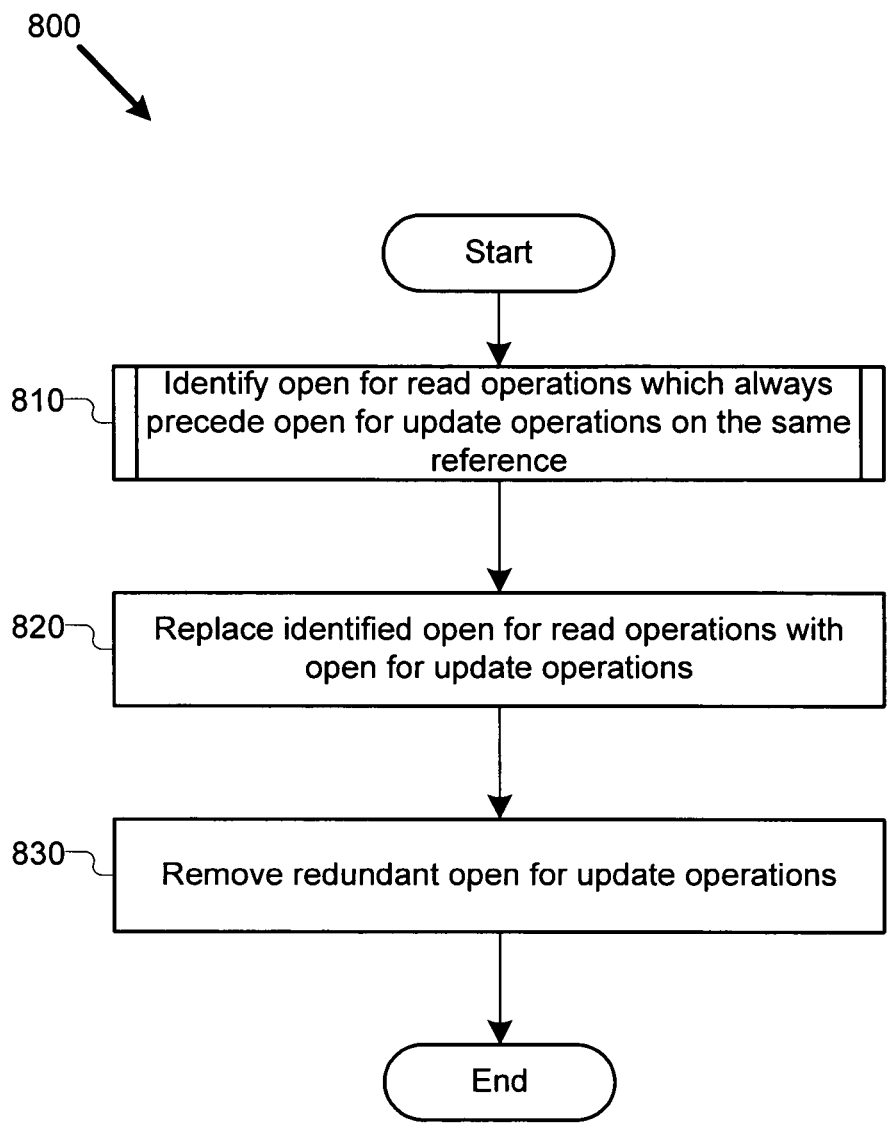
FIG. 8 is a flowchart illustrating an example process performed by the compiler of FIG. 1 for removing read-to-update upgrades.

FIG. 8 is a flowchart of an example process 800 for removing unnecessary read-to-update upgrades. Process 800 corresponds to block 540 of FIG. 5. In various implementations, the illustrated process blocks may be merged, divided into sub-blocks, or omitted. The process begins at block 810, where the compiler identifies open-for-read operations which are always followed by open-for-update operations on the same reference. Note that while the examples herein utilize object pointers, described techniques for eliminating unnecessary read-to-update upgrades also implement removal for interior pointers and static fields. The compiler needs to determine that the opening operations are on the same object (or surrogate object, in the case of one implementation of static fields).

In one implementation, the analysis requires that the object reference or interior pointer be the same local variable and that the variable not be updated in between the operations. While this implementation could miss removing an upgrade over an assignment, other implementations analyze assignments as well. In another implementation, static fields (or variables) are controlled through open operations on surrogate objects, which allows upgrades to be removed between two different static fields when a single surrogate object controls all static fields. An example process of the process of block 810 will be described in greater detail below with respect to FIG. 9.

Next, at block, 820, the open-for-read operations which were identified at block 810 are replaced with open-for-update operations on the same reference. Then, at block 830, redundant open-for-update operations are removed. In one implementation, this is not performed immediately after the process of block 820, but is instead performed by the compiler optimizations described for FIG. 6, such as CSE.

A first exemplary implementation of a read-to-upgrade removal analysis removes upgrades within basic blocks. Thus, the compiler looks at each basic block in the entire program, and for each scans to find open-for-read operations. When the first one is found, the compiler scans ahead looking for an open-for-update operation or assignments to the variable pointing to the object being opened. If the open-for-update occurs first, then the compiler converts the open-for-read to an open-for-update operation and deletes the original open-for-update. If the variable is updated, that search is abandoned. In an alternative implementation, the compiler can scan backwards from open for update operations to search for open-for-read operations.

Figure 9:
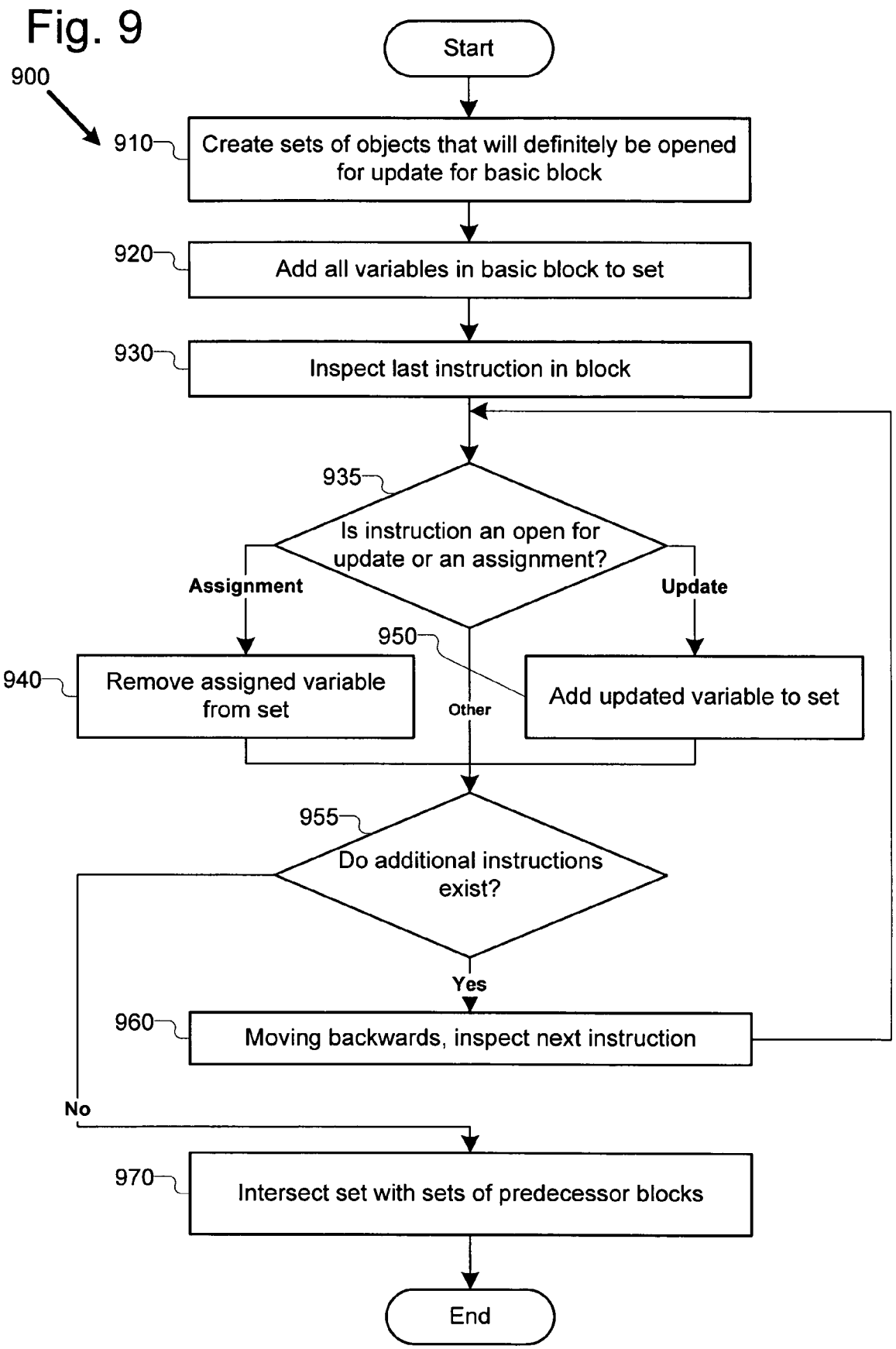
FIG. 9 is a flowchart illustrating a further example process performed by the compiler of FIG. 1 for removing read-to-update upgrades.

FIG. 9 is a flowchart of a second example process 900 for removing identifying open-for-read operations which are always subsumed by open-for-update operations. Process 900 corresponds to block 810 of FIG. 8. In various implementations, the illustrated process blocks may be merged, divided into sub-blocks, or omitted.

The process of FIG. 9 utilizes a standard backward dataflow analysis. In this analysis, the compiler computes at every program point the set of objects that definitely will be opened for update in the future. In various implementations, the process of FIG. 9 is performed for each of every basic block in a program, or for subsets of the basic blocks. The process begins at block 910, where sets are created at the basic block boundary to contain indications of objects that are definitely updated. At block 920, all variables in the basic block are added to the set. Then, at block, 930, the analysis of instructions in the basic block begins by inspecting the last instruction in the block. At decision block 935, the compiler considers the form of the instruction. If the instruction is an assignment (e.g. "x= ... "), at block 940, the variable assigned to is removed from the set. If the instruction is an open-for-update instruction, however, at block 950, the variable opened by the instruction is added to the set.

In either event, or if the instruction is of another type, the compiler moves on to decision block 955, where it determines if additional instructions exist within the basic block. If so, at block 960 the compiler moves backwards across the control flow graph and finds the next instruction in the control flow graph and the process repeats. When the compiler determines at decision block 955 that there are no more instructions, the beginning of the basic block has been reached. When the compiler reaches the beginning of the block, at block 970 it finds the predecessors of the block (i.e. the blocks that can jump to the current block) and intersects the set with the sets stored at the end of each of those predecessors. In one implementation, the process of FIG. 9 is repeated until nothing changes anymore, giving a current set at the end of each block. The compiler can walk backwards through the block updating the set in the same way to get the set for each program point.

At this point, the variables in the "must be opened for update in the future" set are identified for the purposes of block 810. Then, in one implementation, open-for-update operations are added for each of those variables, allowing CSE to remove extra open-for-update operations later. In another implementation, partial redundancy ("PRE") is used instead of aggressive addition of open-for-update instructions followed by CSE optimization. This is a more general solution and can yield code with fewer open instructions on some paths.

In one implementation, the analyses described above assume that exceptions are not raised and so ignore exception edges and compute sets of objects that definitely will be opened for update in the future given that no exceptions are thrown. This is because exceptions are not the common case. This loss of precision does not impact correctness. However, alternative implementations could be extended to consider exception edges in order to yield precise results.

Additionally, in alternative implementations, the analyses above could be modified to ignore other pieces of code. This can be done by utilizing heuristics which indicate that the ignored code is executed relatively infrequently compared with code which is analyzed. In one implementation these heuristics are statically determined; in another they are determined from profile information.

As an example, after performance of the above processes, the code of Example 3 is simplified to the following, more efficient code:

Example 3.1

```
public int Sum( ) {
    tm_mgr tx = DTMGetTMMgr( );
    DTMOpenForUpdate(tx, this);
    Node n = this.head;
    int t = 0;
    do {
        DTMOpenForRead(tx, n);
        t += n.Value;
        if (n==this.Tail) {
            DTMLogFieldStore(tx, this, offsetof(List.Sum));
            this.Sum = t;
            return t;
        }
        n = n.Next;
    } while (true)
}
```

2.2.3 Moving Operations in the Presence of Procedure Calls

Many existing compiler optimizations can only compare, eliminate, and move code within functions, as the techniques are generally too expensive to apply to a graph of the entire program. However, through a high-level STM optimization of moving STM operations across procedure boundaries, these optimizations can perform more efficiently.

As an example, given the code:

```
Foo(object obj) {
    DTMOpenForUpdate(obj);
    ...
}
Bar( ) {
    obj = ...;
    DTMOpenForUpdate(obj);
    Foo(obj);
}
``` it is clear that Foo will always open the object referred to by its parameter for update. The caller of Foo may also open that object (as above) or it may be calling Foo within a loop (or a number of other things). However, the procedure call prevents analysis/optimization of Foo's actions with the code in the caller. This optimization moves the open operation across the call barrier to create more opportunities for other optimizations. CSE is an obvious candidate as the caller may have already done the operation that is moved to it. Other, non-transaction-specific optimizations may also be improved (for example, if the same object is repeatedly passed to a function in a loop, then the open could be hoisted out of the loop).

In one example, this optimization is implemented for the DTMGetTMMgr and DTMOpenFor* operations. In alternative implementations, the optimization could be performed for other operations that must happen if a method is called. Additionally, in alternative implementations, the optimization can be performed on operations that will usually happen if a method is called, sacrificing precision and performance in uncommon cases for better performance in common cases without losing soundness. In one implementation, the compiler performs the optimization on non-virtual (also called "direct") calls; this includes virtual calls that have been "devirtualized" (e.g. determined that only a single call target exists and replaced the virtual call with a direct one).

Figure 10:
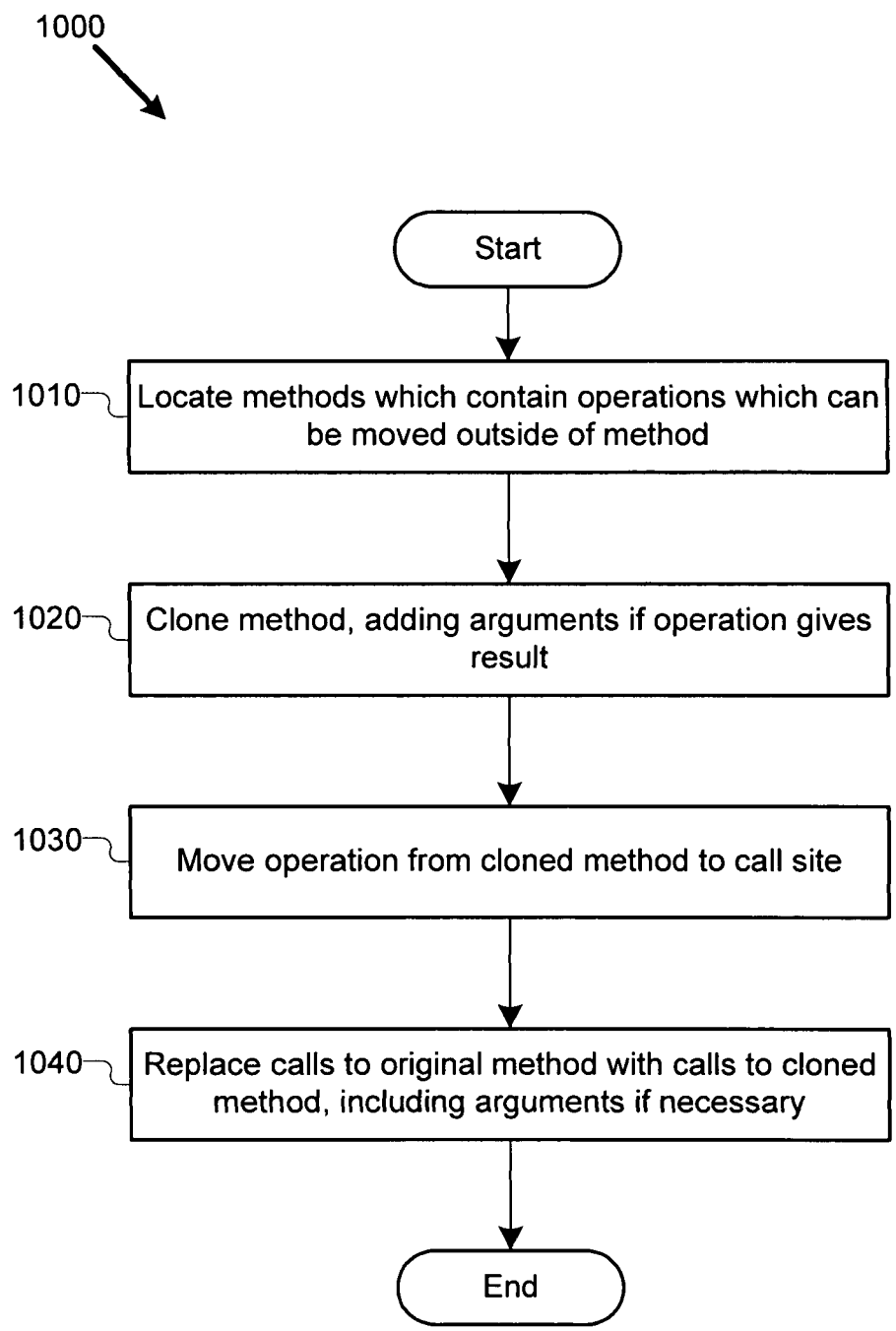
FIG. 10 is a flowchart illustrating an example process performed by the compiler of FIG. 1 for moving operations around procedure calls.

FIG. 10 is a flowchart of an example process 1000 for optimizing STM operations by moving them across method boundaries. Process 1000 corresponds to block 560 of FIG. 5. In various implementations, the illustrated process blocks may be merged, divided into sub-blocks, or omitted. The process begins at block 1010, where methods which contain operations which can be moved outside of the method are located. Next, at block 1020, the method is cloned to create a version of the method which allows the operation to be performed outside of the method. If the operation gives a result, the process of block 1020 also adds an argument to the cloned method so that the result can be passed to it.

Next, at block, 1030, the operation is moved out of the cloned method to the one or more call sites for the method. In an alternative implementation, rather than cloning the method exactly and removing the operation, the cloned method is created without the moved operation. Then, finally, at block 1040, calls to the original method are replaced with the cloned method. In one implementation of the replaced calls, additional arguments are included which are used by the cloned methods. Examples of these additional arguments are shown below.

In another implementation of replacement of calls, the compiler maintains a set of the methods that it has cloned and a mapping from those methods to their cloned (specialized) versions. The compiler then scans all methods in the program again to replace the calls. In some cases, this technique eliminates the original version of the function entirely. In some cases however, (for example, if the address of the function is taken), there will still be calls to the unspecialized version and it can not be removed.

Different operations will cause methods to be cloned in different ways. In one example, if a method contains GetTxMgr, the compiler clones the method, adds an extra parameter to receive the transaction manager, and replaces all occurrences of GetTxMgr with that parameter:

```
FuncUsesMgr( ) {
    ...
    m = GetTxMgr( );
    ...
}
==> FuncUsesMgr_copy(TxMgr mgr) {
    ...
    m = mgr;
    ...
}
```

In this example, calls to the method are changed to calls to the cloned method with an additional argument containing the transaction manager:

```
Call<FuncUsesMgr>( )
==> mgr = GetTxMgr( );
    FuncUsesMgr_copy(mgr);
```

In another example, instead of having a single characteristic to track and create a specialized clone based on (the transaction manager), there are many (each parameter and each static surrogate). For example,

```
Foo(object obj1, object obj2, object obj3) {
    DTMOpenForRead(obj1);
    DTMOpenForUpdate(obj3);
    ... .
}
```

In this example, the compiler would like to create a specialized version that expects the caller to open obj1 and obj3 appropriately (but not necessarily obj2). In one implementation, this is done by performing the "must be opened for update at some point in the future" analysis described above as part of the process of block 1010. Here the analysis tracks only parameters and static surrogates, but is also extended to do "open-for-read" as well as "open-for-update" operations. The compiler then analyzes sets at the root of the function. If they are non-empty, then the compiler clones the method as above except for moving the appropriate open operations around instead. The compiler stores on the cloned function which parameters are expected to be opened (and whether for read or update) for other optimizations to see.

2.2.4 Reducing Log Operations for Newly-Allocated Objects

A final high-level optimization serves to reduce the number of log operations by removing log operations in a transaction for objects which are newly-allocated within the transaction. In particular, it is not necessary to maintain undo log information for objects which never escape the transaction they are created in. This is because the information in the undo log for such an object is only used if the transaction is aborted, at which point the object will be deleted anyway.

Figure 11:
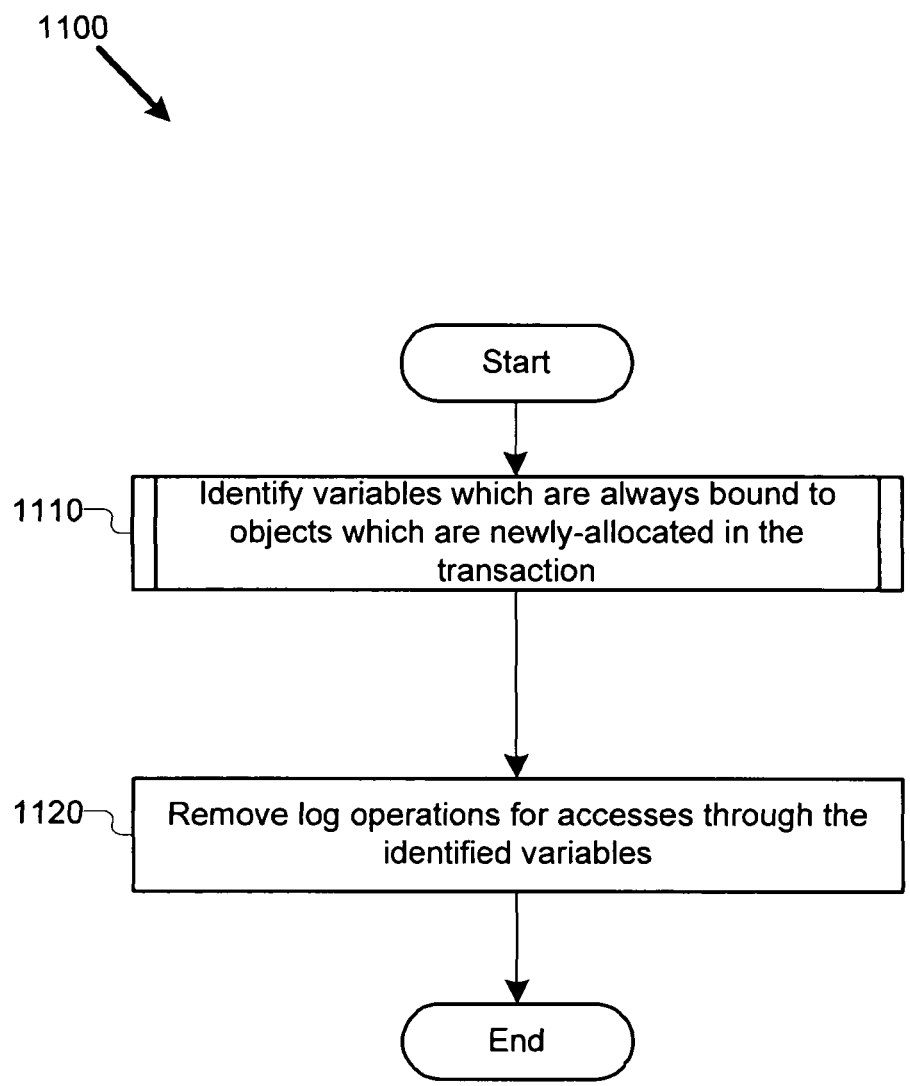
FIG. 11 is a flowchart illustrating an example process performed by the compiler of FIG. 1 for removing log operations for newly-allocated objects.

Essentially, the optimization serves to identify variables that are always bound to objects that were allocated since the start of a transaction and then to delete log operations on these objects. Thus, FIG. 11 illustrates a flowchart of an example process 1100 for removing log operations for newly-allocated objects. Process 1100 corresponds to block 580 of FIG. 5. In various implementations, the illustrated process blocks may be merged, divided into sub-blocks, or omitted.

The process begins at block 1110, where the compiler identifies variables which are always bound to objects which are newly-allocated in their transaction. In various implementations, the process of block 1110 is performed to receive information about variables at different sets of program points in the program being compiled. Thus, the analysis of block 1110 may be performed to learn information about references at a particular point, a small span of code, or through an entire variable lifetime within a transaction.

After this analysis, at block 1120 the compiler removes undo log operations which operate through these variables and the process ends. In one implementation, the compiler performs the process of block 1120 by replacing STM operations which access heap memory with special extended versions of the operations whose decompositions do not include log operations. In another implementation, the compiler performs processes of FIG. 11 after decomposition of the STM operation to explicitly remove decomposed log operations.

The process of block 1110 ranges from simple to complex depending on the code which is being analyzed. In one example, code such as:

```
atomic{
    p = new _____;
    ...
}
``` means that p is always known to refer to a newly-allocated object with in the atomic transaction block. Thus, it is safe to remove log operations which act through p.

However, a piece of code such as:

```
atomic{
    ...
    if (...)
        p = new _____;
    else
        p = q;
    ...
}
``` does not easily provide information about whether p always refers to newly-allocated objects. Thus, the compiler must perform an analysis in order to identify whether variables are eligible for log removal or not.

In one implementation, the compiler uses bit vectors which utilize a vector at every program point that indicates if each variable is known to be definitely referencing a newly-allocated object. While this implementation will correctly identify references for which log operations can be removed, it is generally slow and involves a lot of memory usage. In another implementation, the bit vectors can provide summary information for a large section of code, such as a basic block. This implementation can still be slow for interprocedural analysis.

Figure 12:
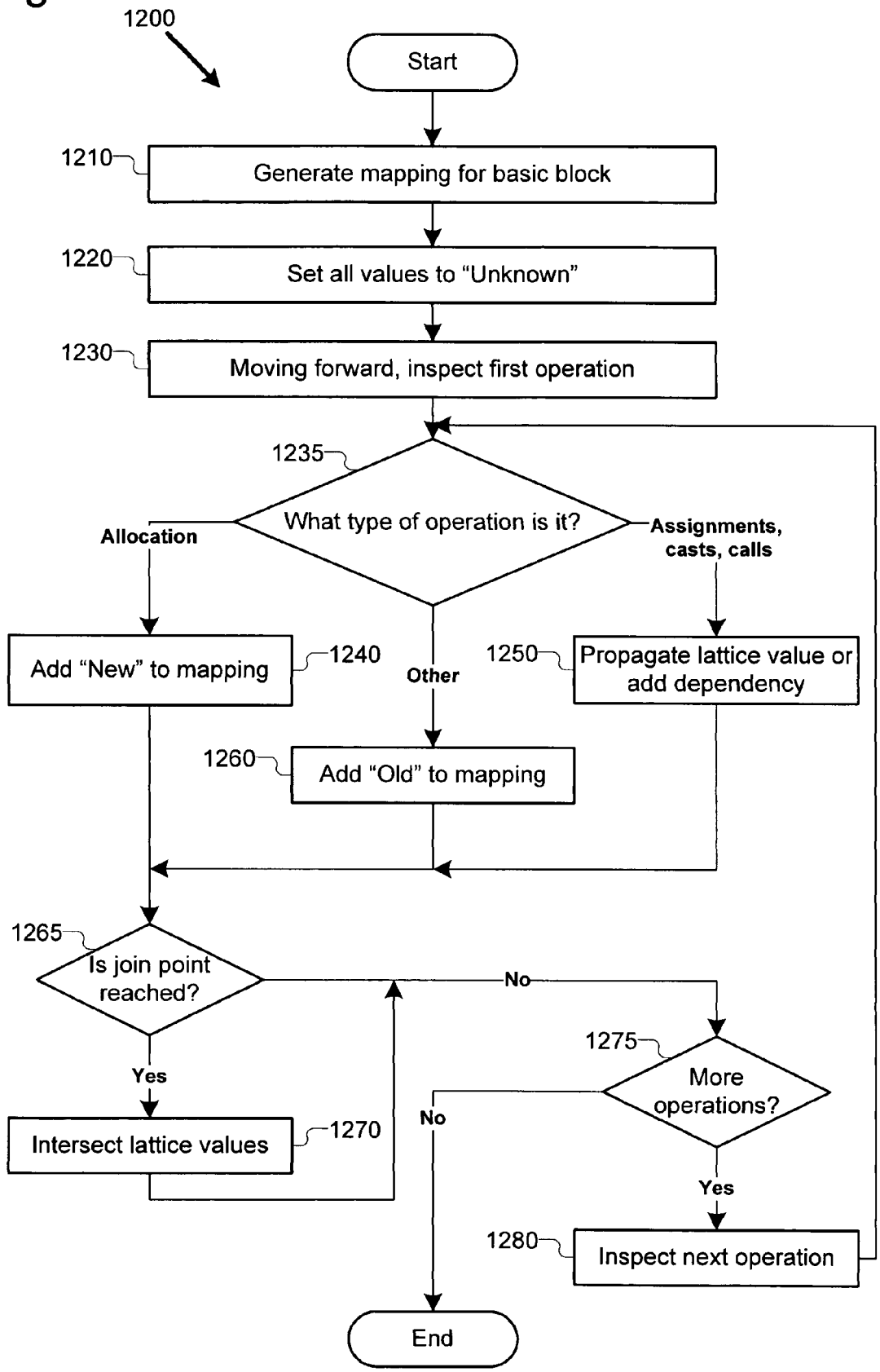
FIG. 12 is a flowchart illustrating a further example process performed by the compiler of FIG. 1 for removing log operations for newly-allocated objects.

As an alternative, in one implementation the compiler uses a flow-sensitive interprocedural analysis to identify variables that are always bound to objects that were allocated since the start of a transaction. FIG. 12 illustrates a flowchart of such an example process 1200. Process 1200 corresponds to block 1110 of FIG. 11. In various implementations, the illustrated process blocks may be merged, divided into sub-blocks, or omitted. In the illustrated implementation, process 1200 is performed on each basic block in a transaction.

The process illustrated in FIG. 12 is performed on each function of the entire program in order to concurrently build and resolve a dependence graph. For each function, the process begins at block 1210, where a mapping is created from object-typed variables to lattice elements or nodes in the dependence graph. The map represents the kinds of values that may be assigned to a variable at any point in the block. In one implementation, the lattice has three elements in it: "Old," which represents variables which reference objects which may not be newly allocated, "New," which represents variables which reference objects that must be newly allocated, and "Unknown," for variables for which there is no information. At block 1220, all values in the mapping are set to "Unknown." Next, at block 1230, the compiler moves forward through the basic block to inspect the first operation in the block. At decision block, 1235, the compiler determines what type of operation it is inspecting. If the operation is an object allocation, at block 1240 the compiler adds a "New" to the mapping for the variable being allocated to. If the operation is an assignment, a cast, or a procedure call, then at block 1250 the compiler propagates lattice values between variables. Thus, assignments and casts propagate their abstract value to the assigned-to variable. Calls propagate abstract values to call formals and from the return value. If, however the operation is anything other than the above cases, at block 1260, the lattice is modified to represent an "Old" for variables to which the operation is assigned. In one implementation, the analysis also considers objects allocated within a committed sub-transaction of the current transaction to be newly-allocated.

The compiler then propagates information forward for the mapping from local variables to lattice values or graph notes and iterates within a function until a fixed point is reached. Thus, at decision block 1265, the compiler determines if a join point, such as the close of an if statement, is reached. If a join point has been reached, at block 1270 lattice values from predecessor blocks are point-wise intersected with the existing map for the current block. For the purposes of the analysis, the beginning of a function is considered a join point from all of its call sites. In either event, the process proceeds to decision block, 1275, where it determines if there are more operations to inspect. If so, the process, at block 1280, inspects the next operation in the block and repeats at decision block 1235. If not, the process ends. This process may cause propagation through the graph into variables from other functions. Once the process has been performed on every basic block in a transaction, those variables which have been labeled with "New" can have their log operations removed. The dependency tracking means that, in various implementations, functions may be processed in different orders. It also means that a function need not be analyzed a second time if a new caller or callee of the function is determined.

3. Examples of Runtime Optimizations

In this section the implementation of a decomposed direct-access STM is described. In overview, a transaction uses strict two-phase locking for updates, and it records version numbers for objects that it reads from so it can detect conflicting updates. A roll-back log is used for recovery upon conflict or deadlock. One optimization involves extending the object format to support the version numbers used by the commit operation, as well as a fast technique for determining changes to an object based on this extension. Runtime filtering of entries to the transactional memory's logs is also described.

3.1 Atomic Commit Operations

The extension of the object structure is understood within the context of an atomic commit operation in the STM implementation described herein. In one example of an atomic commit, DTMStart is called, objects are opened for reading and update, and the commit concludes by calling DTMCommit to attempt to perform those accesses atomically.

Internally, the commit operation begins by attempting to validate the objects that have been opened for reading. This ensures that no updates have been made to them by other transactions since they were opened. If validation fails, a conflict has been detected: the transaction's updates are rolled back and the objects it opened for update are closed, whereupon they can be opened by other transactions. If validation succeeds then the transaction has executed without conflicts: the objects that it opened for update are closed, retaining the updates.

The validation process checks that there were no conflicting updates to the objects that the transaction read during the time span from the calling of the DTMopenForRead command to validation. Holding objects open for update prevents conflicts during the time span from the calling of the DTMopenForUpdate command to the closing of objects in the STM log. Consequently, there is no conflicting access to any of the objects opened during the intersection of these time spans; the transaction can be considered atomic just before validation begins.

3.2 Runtime Environment

Figure 13:
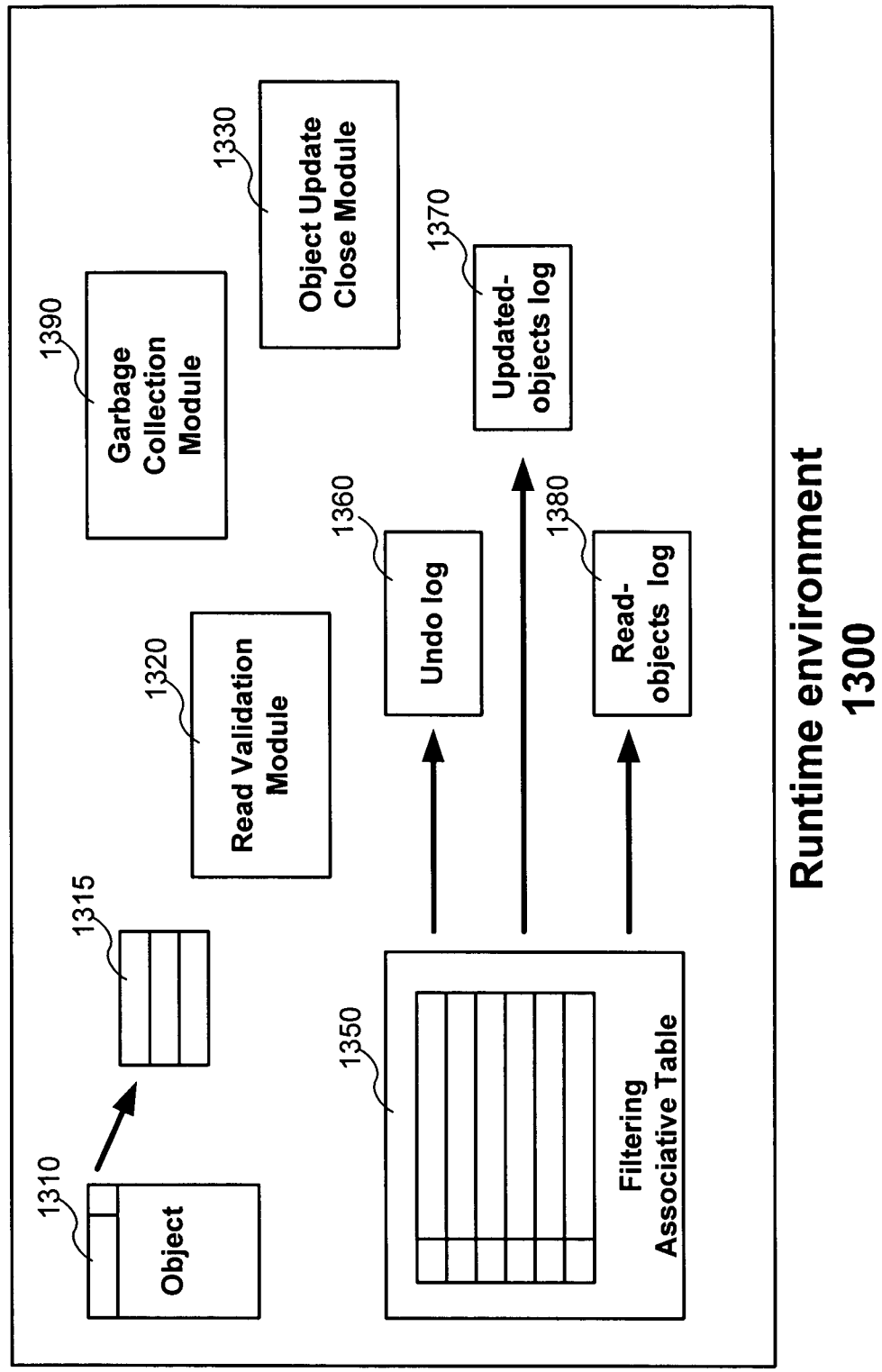
FIG. 13 is a block diagram comprising software modules used during runtime in a runtime environment of a software transactional memory system.

FIG. 13 is a block diagram illustrating an example of objects and software modules which operate to optimize STM performance during runtime in a runtime environment 1300. While FIG. 13 illustrates particular modules separately, it should be recognized that, in various implementations, the modules may be merged or divided in various combinations, or may operate as parts of other runtime software structures which are not illustrated. FIG. 13 illustrates an object 1310 operating in the runtime environment, along with an inflated word header 1315. The operation of the object with its inflated word header will be described in the next section. FIG. 13 also illustrates a read validation module 1320 and a object update close module 1330 for implementing the validation and close procedures of the STM implementation, as described above. Particular facets of these modules with respect to objects in the runtime environment are described herein. FIG. 13 additionally illustrates a filtering associative table 1350, which, in some implementations, filters and prevents unnecessary entries from being logged in various combinations of the undo log 1360, the updated-objects log 1370, and the read-objects log 1380. Particular implementations of this filtering process are described in greater detail below. Finally, FIG. 13 illustrates a garbage collection module 1390 which serves to de-allocate objects when they are no longer reachable in the executing program and to compact STM logs during garbage collection. Particular implementations of this garbage collection module are described below.

3.3 Object Structure

This section describes examples of structures used to support the validation of read-only objects and the open and close operations on objects that are updated. In one implementation, the STM utilizes two abstract entities on each object for the purpose of operations on the object: an STM word, used to coordinate which transaction has the object open for update, and an STM snapshot, used in fast-path code to detect conflicting updates to objects the transaction has read. Examples of operations using these data structures are as follows:

```
word GetSTMWord(Object o)
bool OpenSTMWord(Object o, word prev, word next)
void CloseSTMWord(Object o, word next)
snapshot GetSTMSnapshot(Object o)
word SnapshotToWord(snapshot s)
```

An object's STM word has two fields. One is a single bit which indicates whether or not the object is currently open for update by any transaction. If set, then the remainder of the word identifies the owning transaction. Otherwise the remainder of the word holds a version number. OpenSTMWord performs an atomic compare-and-swap on the STM word (from prev to next). CloseSTMWord updates the word to a specified value.

Figure 14A:
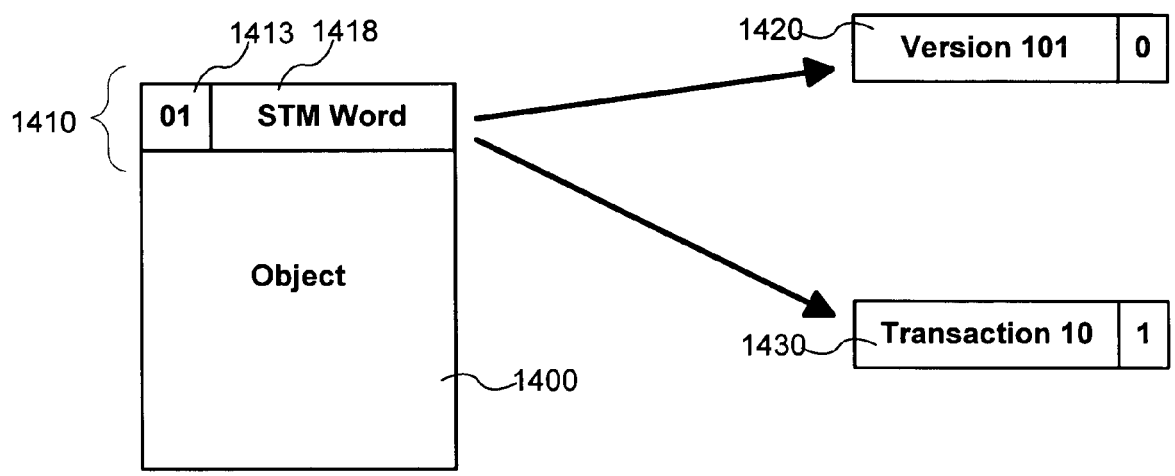
FIGS. 14a and 14b are block diagrams illustrating exemplary objects using multi-use header words.
Figure 14B:
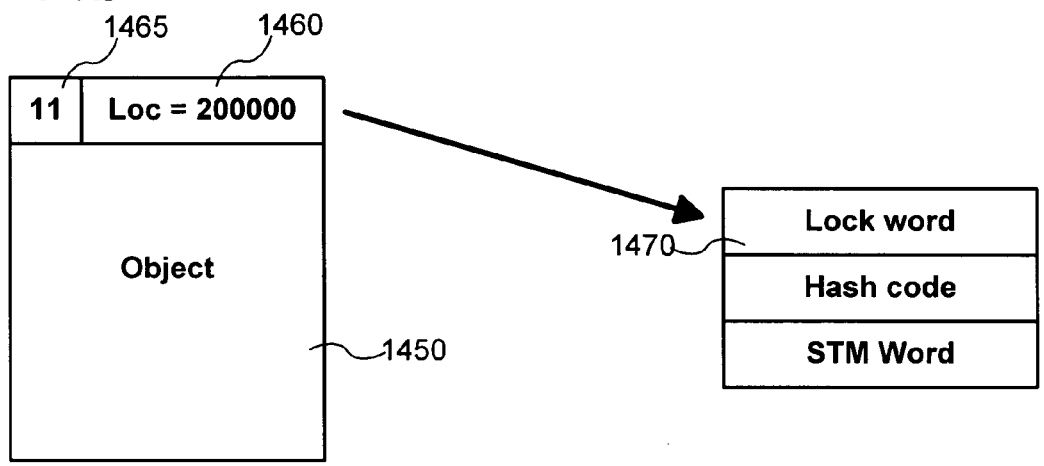

FIGS. 14*a* and 14*b* illustrate an example of implementing STM words in objects. The illustrated implementation utilizes the fact that the Bartok runtime associates a single multi-use header word with each object when representing that object in memory, using this to associate synchronization locks and hash codes (neither of which are components of the STM techniques described herein) with objects. In FIGS. 14*a* and 14*b* this multi-use header word is extended with an additional state to hold the STM word of objects that have ever been opened for update in a transaction. Thus, in FIG. 14*a*, an object 1400 comprises a multi-use header word 1410, which comprises an indicator 1413 of the type of value that is stored in it, followed by the actual STM word 1418. The use of the indicator 1413 allows the multi-use word to be used for hash codes and locks by using different indicator values. In one implementation it is assumed that, if the indicator 1413 for an object indicates that a lock or hash code is stored in the word, there is as of yet no STM word for the object. As FIG. 14*a* also illustrates, the STM word 1418 can have two types of values, as described above. In example 1420, the STM word comprises a bit which indicates the object 1400 is not open for update, and thus the rest of the word holds a version number. In example 1430, the STM word comprises a bit which indicates the object is open for update, so the STM Word identified the transaction which has opened the object for updating.

In another implementation, if the multi-use word is needed for more than one of these purpose (e.g. for a hash code and an STM word) then it is inflated and an external structure holds the object's lock word, hash code, and STM word. Thus, in FIG. 14*b*, an object 1450 is illustrated using an inflated header word. The indicator 1465 of the multi-use word of the object contains a value that indicates that the header word has been inflated, and the remaining value 1460 of the multi-use word contains a memory address for the inflated header word structure. Thus, in FIG. 14*b*, the multi-use word points to the inflated header word structure 1470, which comprises a lock word, a hash code, and an STM word.

In contrast to the STM word, an object's STM snapshot provides a hint about the object's transactional state. In one implementation, the runtime environment guarantees that the snapshot changes whenever CloseSTMWord is called on the object—that is, whenever a thread releases update-access to the object. This provides sufficient information to detect conflicts.

One method of guaranteeing this condition is to implement the STM snapshot as the value of the object's multi-use word. Clearly, this implementation means the snapshot will change when the STM word is stored directly in the multi-use word. However, it will not necessarily change when an inflated header word is used. In one implementation, the snapshot for objects using inflated header words could track down and explore the inflated header word for each object. However, this is an inefficient practice that is at odds with the goal of making fast snapshot instructions. Thus, in another implementation, if the multi-use word has been inflated then CloseSTMWord creates a new inflated structure and copies the contents of the previous structure to it. This allows the STM snapshot to be always implemented as the value of the object's multi-use word while remaining fast.

Figure 15A:
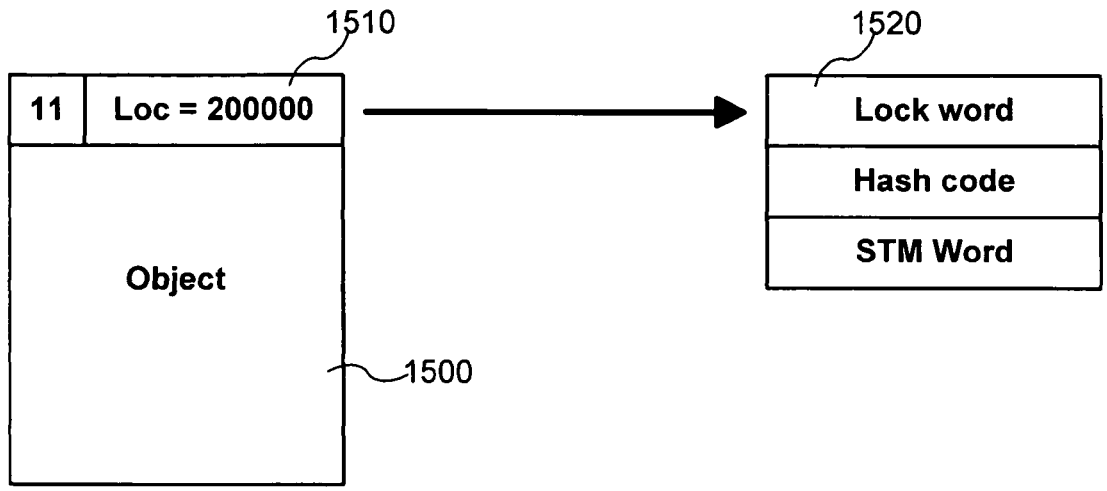
FIGS. 15a and 15b are block diagrams illustrating an exemplary object with a changing snapshot.
Figure 15B:
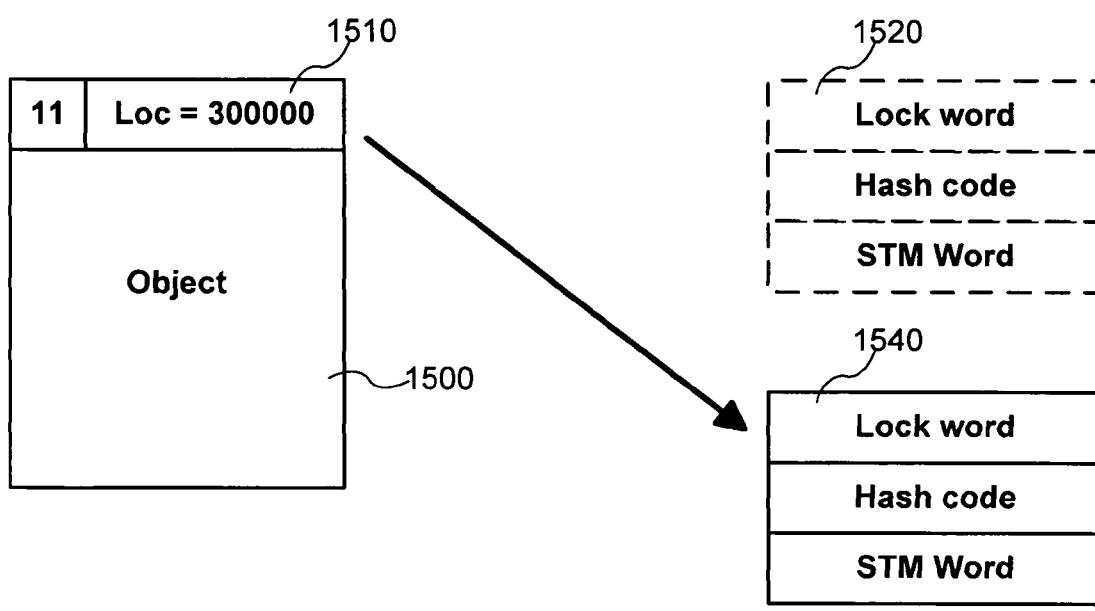

FIGS. 15*a* and 15*b* illustrate the effects of such an implementation of CloseSTMWord. In FIG. 15*a*, an object 1500 is illustrated before execution of CloseSTMWord. The object 1500 uses an inflated header word 1520 and stores the address of the inflated header word 1520 in its multi-use header word 1510. FIG. 15*b* illustrates changes to the object and the runtime memory after execution of CloseSTMWord. After execution, a new inflated header word data structure 1540 has been created, and the address stored in the multi-use header word 1510 has changed. This means, the snapshot, which comprises the value of the multi-use word 1510, has changed as a result of the close.

Figure 16:
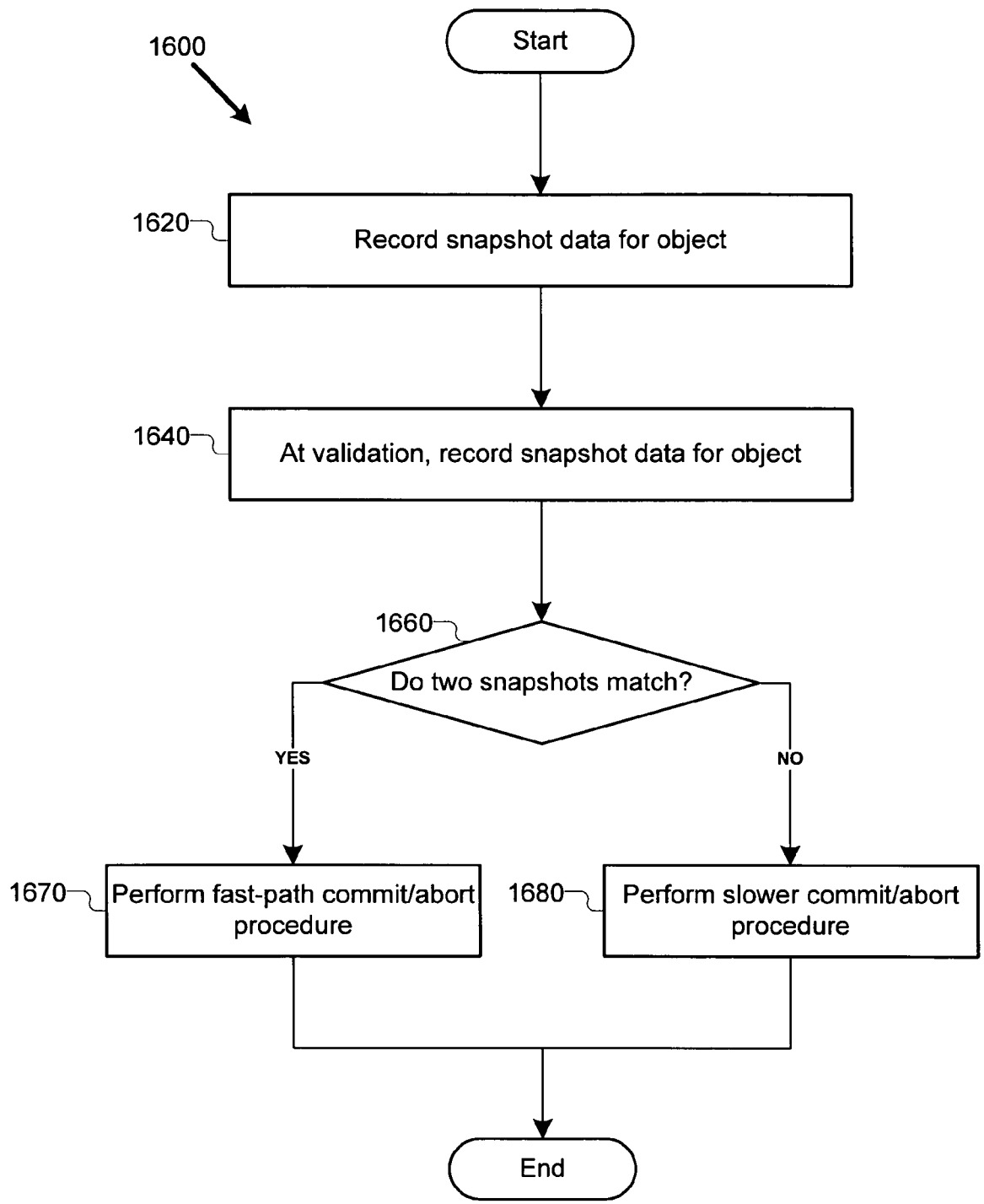
FIG. 16 is a flowchart illustrating an example process of the runtime environment of FIG. 6 for validating an object using snapshots.

FIG. 16 is a flowchart of an example process 1600 for performing a validation using object snapshots. In various implementations, the illustrated process blocks may be merged, divided into sub-blocks, or omitted. The process begins at block 1620, where snapshot data is recorded for an object. In one implementation, this recording is performed when an object is opened for a read. Next, at block 1640, the read validation module 1320 records a second snapshot for the object at validation time during a commit operation. At decision block 1660, the module compares the two snapshots to see if they are identical. If they match, the process continues to block 1670, where the transaction is allowed to continue with commit/abort procedures which take advantage the fact that the snapshot has not changed to perform fast-path tests. If the snapshots do not match, at block 1680 the read validation module 1320 performs commit/abort procedures which cannot utilize the existence of matching snapshots to determine if the transaction can commit or abort and the process ends. In one implementation, these two different sets of procedures are known as fast-path and slow-path procedures.

The key difference between the processes of block 1670 and 1680 is that processes for block 1670 may avoid unnecessary tests or memory accesses because of the knowledge that the snapshot has not changed, and thus may execute more quickly than tests of block 1680. In various implementations, the exact nature of these tests may depend on the nature of the underlying transactional memory implementation. For example, in one implementation, described below in code Example 6, code performing a validation where the two snapshots match need only check a single STM word to determine if it is owned by a transaction and if that transaction is the same as the one currently validating. By contrast, when snapshots do not match in this Example, a second STM word must be looked up, as well as an update entry in certain circumstances. These additional memory accesses, as well as the additional comparisons that are performed on them, mean this implementation of block 1680 is generally slower than the corresponding implementation of block 1670.

FIG. 17 is a flowchart of an example process 1700 for modifying an object using an inflated header word. In various implementations, the illustrated process blocks may be merged, divided into sub-blocks, or omitted. The process begins at block 1720, where the object is modified. In one implementation, this may be because of an STM update instruction. In another implementation, the object's inflated header word itself may be modified, either in the lock word or the hash code. Next, at block 1740, the object update close module 1330, responding to a close instruction, creates a new inflated header word. The process continues to block 1760, where the module copies information from the old header word to the new header word. Then, at block 1780, the object update close module 630 modifies the multi-use header word of the object to point to the new inflated header word.

Finally, at block 1790, if garbage collection is taking place, the old inflated header word is left in place until reclamation by the garbage collector 1390. The object update close module does this to prevent the scenario where a second change is made to the object in a different thread and a third inflated header word is written in memory reclaimed from the first inflated header word. If this were to happen while a transaction reading the object were open, the snapshot for the object could appear to not have changed at commit time, even though it has changed twice. This could allow the transaction doing the read to commit when it should have aborted due to the two modifications on the object. In one implementation, the process of block 1790 is performed by leaving the object in place until such a time as it is safe to reclaim the object, in one example this is done when no transactions have the object open for a read.

4. Examples of STM Logging and Commit 4.1. Examples of STM Log Structure

Each thread has a separate transaction manager with three logs. The read-object log and updated-object log track objects that the transaction has open-for-read or for update. The undo log tracks updates that must be undone on abort. All logs are written sequentially and never searched. Separate logs are used because the entries in them have different formats and because, during commit, the system needs to iterate over entries of different kinds in turn. Each log is organized into a list of arrays of entries, so they can grow without copying.

Figure 18A:
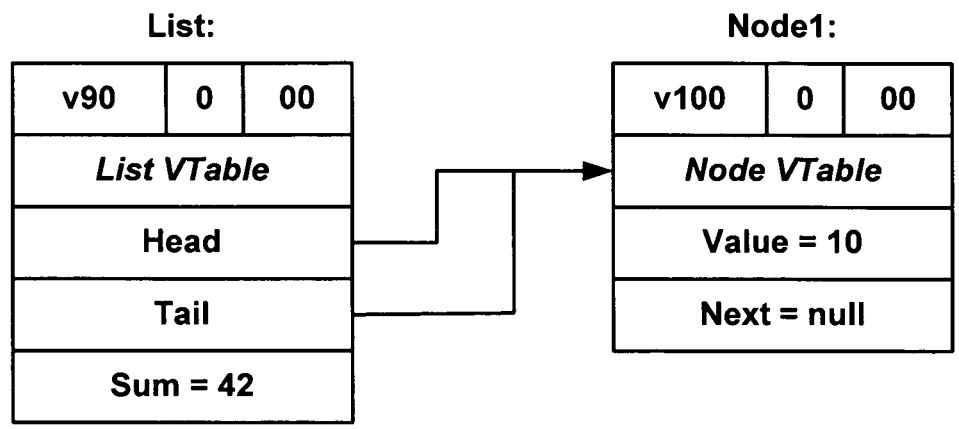
FIGS. 18a and 18b are block diagrams illustrating examples of transaction execution.

FIGS. 18a, 18b, and 19a-c illustrate the structure of the logs using the list example from Example 2a. FIG. 18a shows the initial state of a list holding a single node with value 10. It is assumed that the multi-use words of the objects are both being used to hold STM words—in this case the objects are at versions 90 and 100. In the illustrated examples of FIGS. 18a, 18b, and 19a-c, the two-digit values on the right-hand side of the STM word correspond to the indicators of FIGS. 14a, 14b, 15a, and 15b.

One operation from Example 3 opens this for update, using OpenSTMWord to atomically replace the version number with a pointer to a new entry in the updated-object log. One example of pseudo-code follows as Example 4:

Example 4

```
void DTMOpenForUpdate(tm_mgr tx, object obj) {
    word stm_word = GetSTMWord(obj);
    if (!IsOwnedSTMWord(stm_word)) {
        entry -> obj = obj;
        entry -> stm_word = stm_word;
        entry -> tx = tx;
        word new_stm_word = MakeOwnedSTMWord(entry);
        if (OpenSTMWord(obj, stm_word, new_stm_word)) {
            // Open succeeded: go on to next entry in the log
            entry ++;
        } else {
            // Open failed: make the transaction invalid
            BecomeInvalid(tx);
        }
    } else if (GetOwnerFromSTMWord(stm_word) == tx) {
        // Already open for update by this transaction: nothing
        more to do
    } else {
        // Already open for update by another transaction:
        // become invalid
        BecomeInvalid(tx);
    }
}
```

Figure 18B:
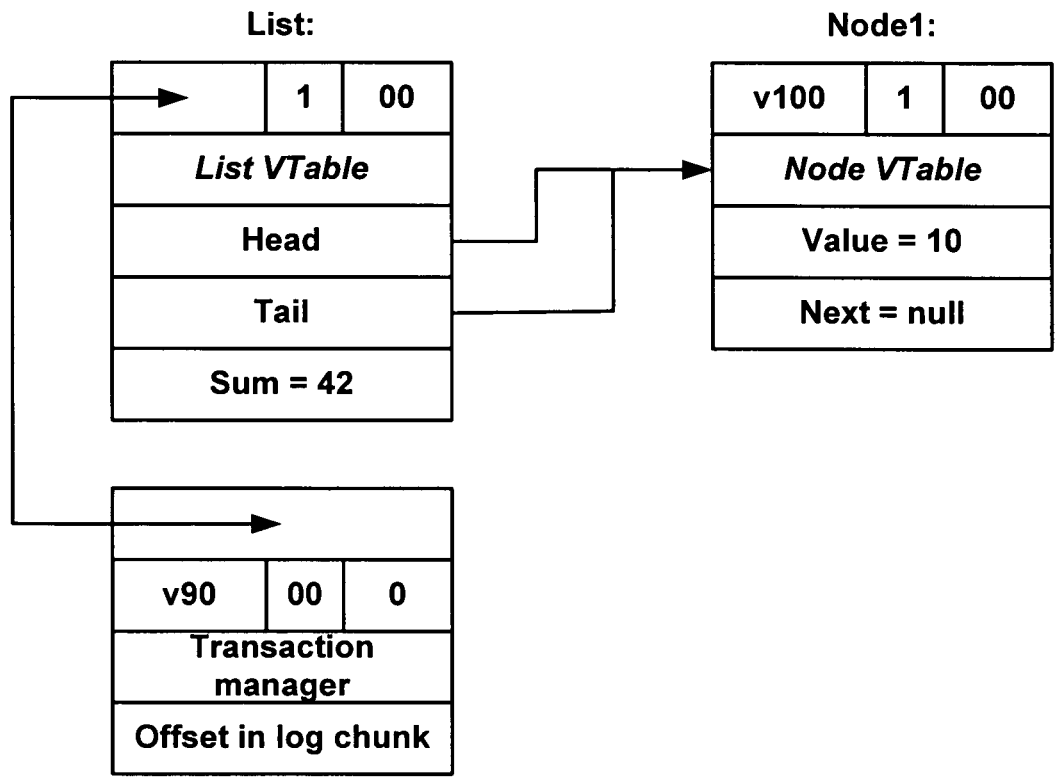

FIG. 18b shows this result. Note that, in the illustrated implementation, the "offset in log chunk" field is used during garbage collection as a fast way to map an interior pointer into the log (such as that from the List node in FIG. 18b) to a reference to the array of log entries holding it.

The list-summing example proceeds to open each list node for read. DTM makes this straightforward: for each object the object reference and its current STM snapshot are logged. Example 5 shows an example of this in pseudo-code:

Example 5

```
void DTMOpenForRead(tm_mgr tx, object obj) {
    snapshot stm_snapshot = GetSTMSnapshot(obj);
    entry -> obj = obj;
    entry -> stm_snapshot = stm_snapshot;
    entry ++;
}
```

Figures 19A, 19B, 19C:
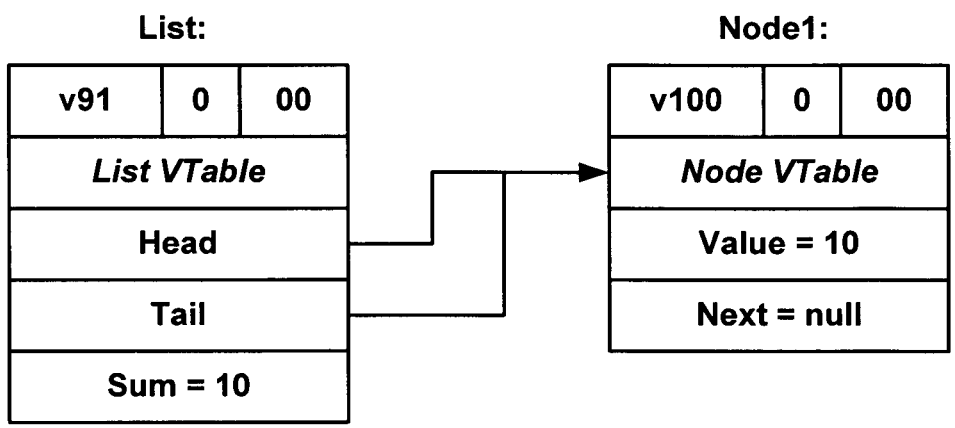
FIGS. 19a-19c are block diagrams illustrating further examples of transaction execution.

FIG. 19a shows the log entry it creates. No attempt is made to detect conflicts, following the design assumption that contention is rare, so the benefits of discovering it early are outweighed by the cost of checking.

After reading the list nodes, the final step is to update the Sum field. DTMLogFieldStore records the overwritten value with an entry in the undo log as shown in FIG. 19b. Pseudo-code for this is omitted—the particular record used is influenced by garbage collection support in the Bartok system used in one implementation; other designs will be appropriate in other systems. The undo log entry records the address of the overwritten value as an (object, offset) pair. This avoids using interior pointers, which are expensive to process in some garbage collectors. The entry also distinguishes between scalar or reference-typed stores. This type information is needed in some garbage collectors. Finally, it records the overwritten value. In another implementation, a shorter two-word log entry could be used that holds just an address and the overwritten word, at the cost of more work during garbage collection.

4.2 Examples of Commit Procedures

There are two phases to DTMCommit in the implementations described herein: the first checks for conflicting updates to the objects opened for reading and the second closes the objects that were opened for update. There is no need to close objects opened for reading explicitly because that fact is recorded only in thread-private transaction logs.

Example 6, as follows, shows the structure of ValidateReadObject. There are a large number of cases in the pseudo-code, but the overall design is clearer if considered as a disjunction of cases in terms of the operations on the DTM interface. The cases V1, V2, and V3 below indicate that no conflict has occurred:

V1—The object was not open for update at any point in the transaction's duration.

V2—The object was open for update by the current transaction for the whole duration.

V3—The object was originally not open for update, and the current transaction was the next transaction to open it for update.

V4—The object was open for update by another transaction for the whole duration.

V5—The object was originally not open for update, and another transaction was the next to open it for update.

These cases are marked in the example pseudo-code. Some occur multiple times because it is useful to distinguish between occasions where the test made on the STM snapshot fails because of an actual conflict, and where it fails without conflict (e.g. because the STM snapshot changed when the object's multi-use-word became inflated).

Example 6

```
void ValidateReadObject(tm_mgr tx, object obj, read_entry
    *entry) {
    snapshot old_snapshot = entry -> stm_snapshot;
    snapshot cur_snapshot = GetSTMSnapshot(obj);
    word cur_stm_word = SnapshotToWord(cur_snapshot);
    if (old_snapshot == cur_snapshot) {
        // Snapshot match: no-one has closed the object
        if (!IsOwnedSTMWord(cur_stm_word)) {
            // V1: OK: Snapshot unchanged, no conflict
```

```
        } else if (GetOwnerFromSTMWord(cur_stm_word) == tx) {
            // V2: OK: Opened by the current tx for
            // update before read
        } else {
            // V4: Opened for update by another tx
            BecomeInvalid(tx);
        }
    } else {
        // Snapshots mismatch: slow-path test on STM word
        word old_stm_word = SnapshotToWord(old_snapshot);
        if (!IsOwnedSTMWord(old_stm_word)) {
            if (old_stm_word == cur_stm_word) {
                // V1: OK: STM word inflated during the
                // transaction
            } else if (!IsOwnedSTMWord(cur_stm_word)) {
                // V5: Conflicting update by another tx
                BecomeInvalid(tx);
            } else if (GetOwnerFromSTMWord(cur_stm_word) == tx) {
                // Current tx opened the object for update...
                update_entry *update_entry =
                    GetEntryFromSTMWord(cur_stm_word);
                if (update_entry -> stm_word !=
                    SnapshotToWord(old_snapshot)) {
                    // V5: ...but another tx opened and closed
                    // the object for update before the current tx
                    // opened it
                    BecomeInvalid(tx);
                } else {
                    // V3: OK: No intervening access by another tx
                }
            } else {
                // V5: The object was opened by another
                // transaction
                BecomeInvalid(tx);
            }
        } else if (GetOwnerFromSTMWord(cur_stm_was) == tx) {
            // V2: OK: Opened by current tx for update before
            // read
        } else {
            // V4: STM word unchanged, but previously open for
            // update by another transaction
            BecomeInvalid(tx);
        }
    }
}
```

Example 7 shows the CloseUpdatedObject operation used to close an object that was open for update.

Example 7

```
void CloseUpdatedObject(tm_mgr tx, object obj, update_entry
    *entry) {
    word old_stm_word = entry -> stm_word;
    word new_stm_word = GetNextVersion(old_stm_word);
    CloseSTMWord(obj, new_word);
}
```

FIG. 19c shows the resulting update to the list structure, with the new version number 91 placed in the list object's header.

It can be observed that, with 29 bits available for the version number, one can obtain around 500M distinct versions. The illustrated design makes it safe for version numbers to overflow so long as a version number is not re-used in the same object while a running transaction has the object open for read—an A-B-A problem allowing the reading transaction to commit successfully without detecting there may have been some 500M updates to the number.

For correctness, in one implementation this is prevented by (a) performing a garbage collection at least once every 500M transactions, and (b) validating running transactions at every garbage collection. An entry in the read-object log is only valid if the logged version number matches the current one: the result is that each garbage collection 'resets the clock' of 500M transactions without needing to visit each object to update its version number.

5. Runtime Log Filtering

This section describes a runtime technique to filter duplicates utilizing a probabilistic hashing scheme to filter duplicates from the read-object log and the undo log. Log filtering is generally useful because a) a log can take up substantial space, draining system resources, and b) once a particular memory location has been logged as having been written to or read, there is no need to log further. This is because, during validation, the only information needed from the read-object log is the object's STM snapshot before the transaction and the only information needed from the undo log is the value of the updated memory locations before the transaction. Because this does not change within the transaction, only one log entry is necessary for a given memory location per transaction.

In the implementation in Section 4 it is unnecessary to filter entries in the updated objects log. This is because DTMOpenForUpdate will not permit duplicate log entries to be created for the same updated object header within the same transaction. In other implementations such duplicates may be created and might therefore be filtered.

Generally, a filter supports two operations. The first, a "filter" operation, returns true if the specified word must be present in the filter. It returns false if the specified word may not be present in the filter, adding the word to the filter as it does so. Such a filter therefore acts as a probabilistic set which admits false negatives when searching (i.e. it may claim that words are not in the filter when in fact they are, but it must not claim that a word is in the filter when in fact it is not). The second operation, "clear," removes all of the words in the filter.

In the context of software transactional memory (STM), a filter can be used to reduce the number of times that contents of the same word are written to one of the transaction logs that the STM maintains.

5.2 Examples of Hash Table Filtering

The filtering scheme described herein probabilistically detects duplicate logging requests to the read-object log and the undo-log using an associative table. While the implementations described herein are with reference to a hash table, it will be recognized that, in alternative implementations, the filtering techniques and systems may use different implementations of the associative table. One implementation uses per-thread tables that map a hash of an address to details of the most recent logging operation relating to addresses with that hash.

It may be noted that, in one implementation, only one associative table is necessary to filter both the read-object and the undo logs. Stores to the read-object log use the address of the object's header word, whereas stores to the undo log use the address of the word being logged. Because these sets of addresses are disjoint, a single table will not demonstrate collisions between read-object and update accesses, and thus can be used for both logs.

FIG. 20 shows the design of the table. FIG. 20 illustrates an associative table implemented as a hash table 2000. As FIG. 20 illustrates, each entry in the hash table 2000 comprises a memory address 2020 and a transaction number 2030. The entries are organized by a series of slot numbers 2010.

In one implementation, a hash code, which identifies the slot number for a particular memory address, is arrived at by splitting an address into the hash index and a tag. Thus, in such an implementation, a hash function simply uses some of the least significant bits from the word W to select the slot S to use in the table. The bits in word W can therefore be considered to be split into two portions: the least significant bits are the hash code, which serve to identify the slot to use, and the remainder serve as a tag to identify the address uniquely. For instance, word 0x1000 would have tag-1 slot-0, word 0x1001 would have tag-1 slot-1, word 0x2000 would have tag-2 slot-0, word 0x2001 would have tag-2 slot-1, and so on. In alternative implementations, different hashing schemes are used.

Additionally, while the hash table 2000 shows the transaction number as separate from the memory address, in various implementations, the transaction number is combined with the memory address, such as with use of an XOR operation. The XOR operation is used, in one implementation, because it is a relatively fast operation and can be undone by a successive XOR. In alternative implementations, different methods of recording the transaction number are used, such as replacing the low-order bits in the memory address with a transaction number, or using the addition operation rather than the XOR operation. These are useful in that they each share the property that, for two addresses $a_1$ and $a_2$ which hash to the same hash code, and two transaction numbers $t_1$ and $t_2$, $op(a_1, t_1)$ equals $op(a_2, t_2)$ only when $a_1=a_2$ and $t_1=t_2$. This property provides confidence that inserted combined values are unique to the particular address and transaction number from which they are created.

The usage of the transaction number, which is thread-local, is to prevent an entry recorded by an earlier transaction from being confused with an entry relating to the current transaction. Identification of the transaction number allows the table to be cleared only when the bits used for the sequence of transaction numbers overflow. In one implementation the table is cleared once every time the sequence of transaction numbers overflows, which avoids conflicts in the table by preventing two entries generated from different transactions from using the same transaction number. In another implementation one slot in the table is cleared per transaction; in some implementations adding a small overhead to every transaction may be preferable to adding an occasional large overhead. In others, it is preferable to perform all table clearing at once.

Figure 21:
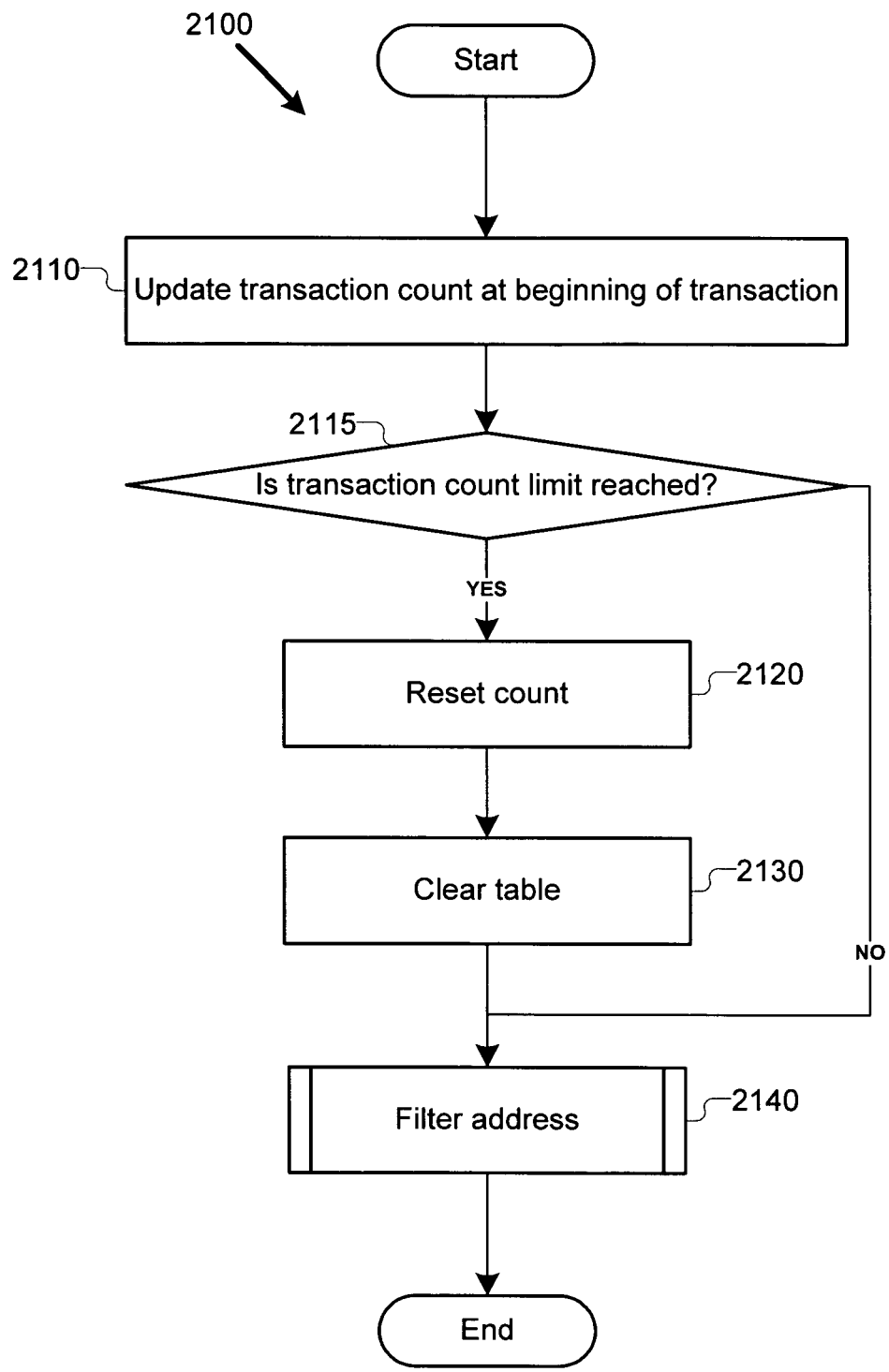
FIG. 21 is a flowchart illustrating an example process of the runtime environment of FIG. 6 for filtering log entries using the associative table of FIG. 13.

FIG. 21 is a flowchart of an example process 2100 for filtering log entries. In various implementations, the illustrated process blocks may be merged, divided into sub-blocks, or omitted. The process begins at block 2110, where a transaction count is updated at the beginning of the current transaction. This count provides the transaction number which is used in the hash table. Next, at decision block 2115, it is determined whether the transaction count limit has been reached. In one implementation, this limit is determined by overflowing the number of bits allotted to the count. In another, the limit may be based on memory limitations or may be chosen to fine-tune the performance of the hash table. If the limit has not been reached, at block 2140 the address which is to be logged is filtered through the hash table. If, by contrast, the limit has been the count is reset at block 2120, and the table is cleared at block 2130. Then, at block, 2140, the address which is to be logged is filtered through the hash table.

Figure 22:
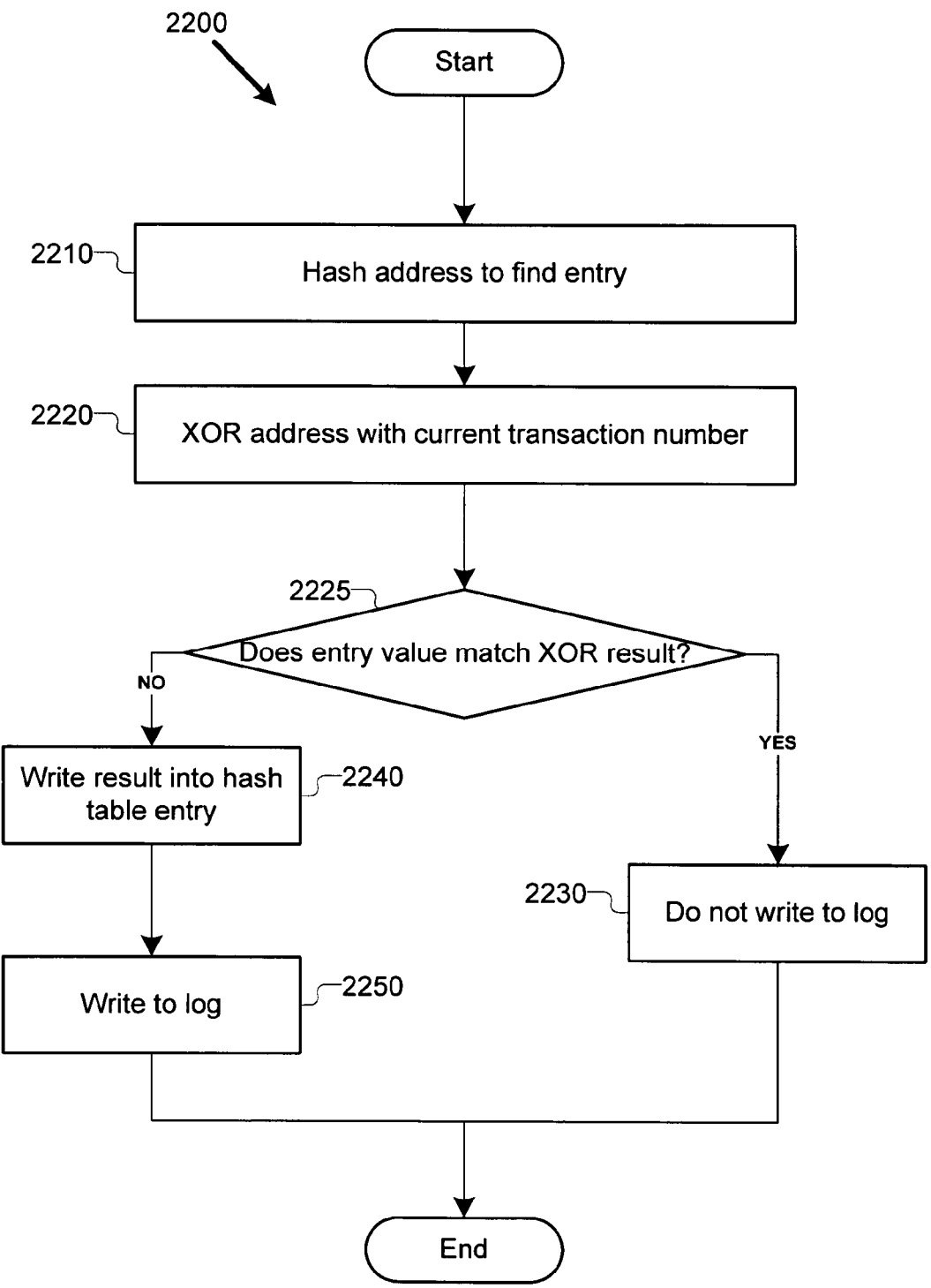
FIG. 22 is a flowchart illustrating a further example process of the runtime environment of FIG. 6 for filtering log entries using the associative table of FIG. 13.

FIG. 22 is a flowchart of an example process 2200 for filtering log entries. In various implementations, the illustrated process blocks may be merged, divided into sub-blocks, or omitted. In various implementations, process 2200 corresponds to the process of block 2140 of process 2100. Process 2200 begins at block 2210 where the address is hashed to find the proper hash table entry. Next, at block 2220, the address to be filtered is XORed with the current transaction number (received from the transaction count). In one implementation, the hashing is performed as described above, by splitting the address into a hash code and a tag value.

The process then proceeds to decision block 2225, where the value of the hash entry is checked against the XOR result. If the two match, then there is no need to log memory access again, and at block 2230 the log is not written to. If, however, the two do not match, then at block 2240 the XOR result is written into the hash table entry, and at block 2250 an entry is written into the log.

5.3 Runtime Log Filtering for Newly-Allocated Objects

In one implementation, the STM system and techniques described herein identify objects allocated by the current transaction in order to avoid writing any undo-log entries for them. This provides a backup in case the static compiler-time analysis described above misses or cannot remove particular log operations for newly-allocated objects. This runtime technique is safe because the objects will be dead if the current transaction aborts. In one implementation, this is done using a version of DTMopenForUpdate that is specialized to work on newly allocated objects, and by having this operation write a designated STM word value to mark the object as transactionally allocated.

6. Examples of Garbage Collection

Generally, garbage collection ("GC") provides a mechanism for automatically determining when a memory object can safely be de-allocated because it will no longer be required by any thread in the program. Garbage collection is incorporated into many modern programming languages and forms part of the Microsoft .NET framework.

This section describes various implementations of integrating GC into the STM techniques described above. However, such integration is not easy. To illustrate the problem, consider the following example:

```
atomic {
    t1 = new LargeTemporaryObject( );
    // Computation E1
    t2 = new LargeTemporaryObject( );
    // Computation E2
}
```

Suppose, for the purposes of the example, that the computations performed at E1 and E2 are both sufficiently complicated that GC is necessary for them to complete without exhausting memory. Furthermore, suppose that the LargeTemporaryObject bound to t1 is used only in E1, and similarly the LargeTemporaryObject bound to t2 is used only in E2. If executed without the 'atomic' block then the space occupied by t1 could be reclaimed once E1 has finished.

This example cannot be executed with existing transactional memory systems and GCs. In these systems, one of two problems will occur:

1. Some non-TM-aware-GCs force all memory transactions to be aborted when a GC occurs. On these systems computations such as E1 and E2 can never be executed in an atomic block.

2. Other non-TM-aware-GCs force objects to be retained for longer than they are with our TM-aware-GC. On these systems the example may execute successfully, but t1 and t2 will be retained until the very end of the atomic block, even if the GC occurs during E2 during which it's known that t1 is subsequently unneeded.

In one implementation, these problems are addressed by a TM-aware-GC which (a) allows GC to occur while threads are in the middle of executing atomic blocks, and (b) allows the GC to recover objects that can be guaranteed to be unneeded by the program whether the atomic block completes successfully or whether it is re-executed.

In various implementations, the garbage collection techniques include techniques for use in implementations of atomic transaction blocks for identifying objects allocated within the current atomic block. Implementations also include techniques for identifying which objects referred to by the STM's data structures are guaranteed to be unneeded by the program. Finally, the GC implementations include techniques for identifying which entries in the TM's data structures are unnecessary for the future execution of the program.

While the description that follows relies in particular on the system described above, implementations described herein are not limited to that setting; they can be used with other forms of transactional memory, possibly including hardware transactional memory.

The implementations described herein are described with reference to a stop-the-world tracing garbage collector, for instance a mark-sweep garbage collector or a copying garbage collector. However, this is for simplicity of exposition and the implementations are not limited to that setting; known approaches can be used to integrate STM with other garbage collection techniques such as generational garbage collection, concurrent garbage collection or parallel garbage collection. In one implementation STM is integrated with generational garbage collection.

At a high level the operation of a stop-the-world tracing GC can be summarized as the following procedure. First, stop all application threads in the application ("mutator threads" as they are sometimes known). Next, visit each of the "roots" by which mutator threads initially access objects, ensuring that the objects referred to from these roots are retained after collection. (Roots include the saved register contents of the processor's running mutator threads, the object references on the threads' stacks and the object references visible to those threads through static fields of the program). The objects thus retained are often referred to as "gray" and the remainder of the objects are initially referred to as "white." Then, for each gray object, visit the object references that it contains. Any white objects that these references identify are in turn marked gray and, once all of the references in a gray object have been visited, the object is marked black. Repeat this step until there are no more gray objects. Any white objects that remain are considered garbage and the space they occupy can be made available to the mutator threads for re-allocation. Finally, restart the mutator threads. In the example below, gray objects will be referred to as "visited" objects, while known-white objects are "unreachable."

In one implementation of integrating STM with GC, all transactions are aborted when starting a GC. This has obvious disadvantages. In another implementation, the GC considers the STM's data structures as part of the roots of the mutator threads, thus visiting objects based on their being referred to by entries in the logs. In such an implementation, references to objects from some logs are considered "strong references" which require the GC to preserve memory reachable through them.

Figure 23:
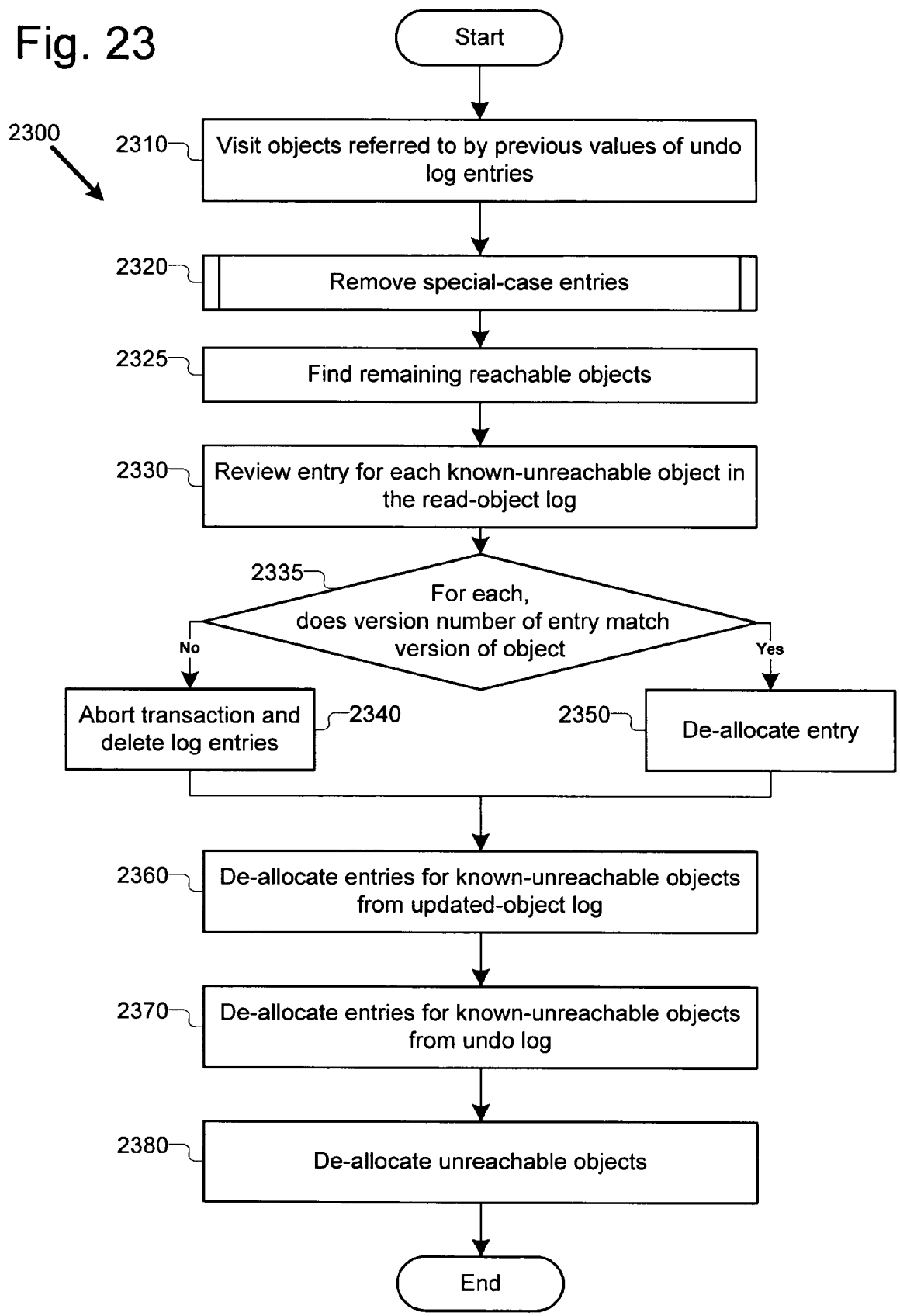
FIG. 23 is a flowchart illustrating an example process performed of the runtime environment of FIG. 6 for compacting logs during garbage collection.

While this implementation allows some degree of integration between the STM system and the GC, in another implementation, there is a greater degree of integration. FIG. 23 is a flowchart of an example process 2300 performed by the garbage collecting module 1390 for performing garbage collection in an STM system. In various implementations, the illustrated process blocks may be merged, divided into sub-blocks, or omitted. In the illustrated procedures below, the GC is able to use special knowledge of STM to de-allocate objects and log entries when it is no longer possible to use them and to compact logs by removing redundant entries. In one implementation, the process of FIG. 23 is performed in place of the step in the typical GC procedure above of visiting each of the object references of a visited object. In alternative implementations, the process of FIG. 23 may be integrated into other general GC procedures.

In some implementations, the process of FIG. 23 recognizes two qualities on logs in the STM system. The first is logs which identify objects on which the current transaction has attempted access. Logs of this kind in various implementations include the references to the objects accessed in the read-objects, updated-objects and undo logs in the implementations described in the PLDI paper. In one terminology, some references to objects from these logs are considered "weak references," meaning that the GC will reclaim memory used by objects that are unreachable except for these weak references. Another quality recognized by the GC in performing this process is logs which identify object references which will be restored to memory upon the commit or upon the abort of the transaction. Logs of this kind include old values in undo-logs. These references from these logs are referred to, in some terminology, as "strong references." As above, "strong references" require the GC to preserve memory reachable through them.

The process begins at block 2310, where the GC module 1390 visits objects referred to by the "previous value" field of each entry in the undo logs 1360, thus preventing these objects from being considered unreachable, and preventing their reclamation in case a current transaction aborts. Next, at block 2320, certain special case entries are removed from the logs. An example of such a removal process is described in greater detail below with respect to FIG. 24.

The process continues to block 2325, where the GC module visits object references contained by each already-visited object, in order to visit every reachable object and arrive at a final set of unreachable objects. Then, at block, 2330, the GC module reviews entries in the read-object log 1380 which refer to unreachable objects. At decision block 2335, the GC module determines, for each entry, if there is a conflicting concurrent access to the object referred to by the entry. In one implementation, the GC does this by determining, for each entry if the version number in the entry matches the version number of the object. If so, the entry is simply de-allocated from the log at block 2350, as the entry is current and the object is unreachable. If, however the version numbers do not match, the current transaction is invalid. At this point, the GC module itself aborts the transaction at block 2340, deleting all log entries for the transaction. In an alternative implementation, the specific checks and processes of blocks, 2335, 2340, and 2350 may be omitted, entries for known-unreachable objects de-allocated from the read-object log without review, and other runtime systems of the STM relied upon to determine whether or not to abort the transaction.

Next, at block, 2360, the GC module reviews entries in the updated-object log 1370 and de-allocates all entries which refer to objects which are unreachable. Then, at block, 2370, the same process is performed for entries in the undo log 1360. Finally, at block, 2380, the GC module proceeds to de-allocate all remaining unreachable objects.

Figure 24:
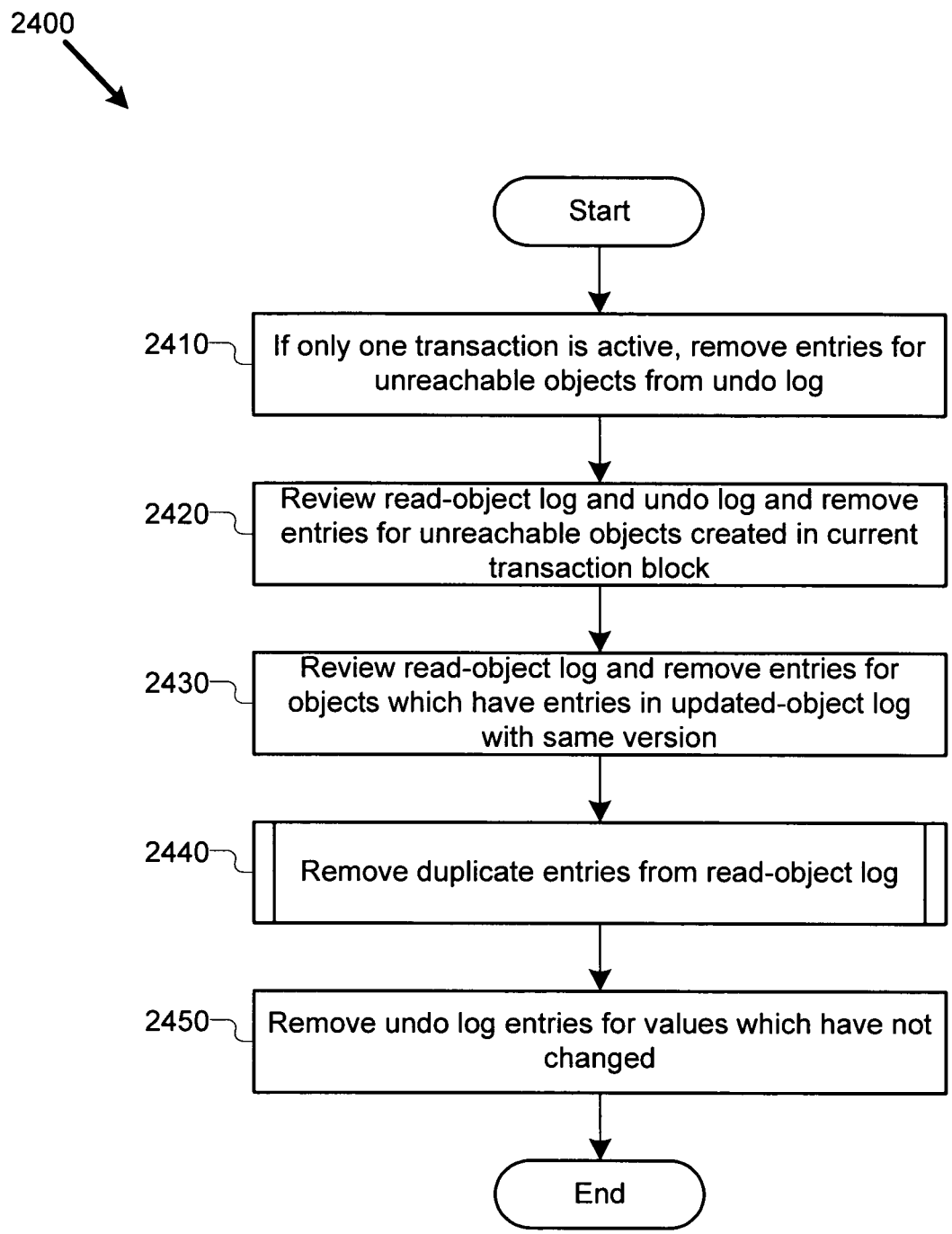
FIG. 24 is a flowchart illustrating a further example process performed of the runtime environment of FIG. 6 for compacting logs during garbage collection.

Extension implementations take advantage of special cases to remove additional entries from the STM logs. FIG. 24 is a flowchart illustrating one such example process 2400 performed by the garbage collecting module 1390 for removing special case log entries. The process of FIG. 24 corresponds to block 2320 of FIG. 23. In various implementations, the illustrated process blocks may be merged, divided into sub-blocks, or omitted. Although the description herein describes these extensions as successive steps which are a part of the processes of process 2400 and block, 2320, it will be recognized that, in certain circumstances, the processes of FIG. 24 can be used independently from one another and, in some cases, independently from the basic implementation (for instance to compact the logs at times other than GC), and that a fast implementation may combine portions of one or more of these steps to reduce the number of times that the entries in the logs must be visited.

Process 2400 begins at block 2410 where, if only one transaction is active, the GC module 1390 immediately rolls back and removes entries from the undo log 1360 which refer to unreachable objects. At block 2420, the GC module reviews the read-object log 1380 and the undo log 1360 and removes entries from those logs if the entries refer to unreachable objects which were created within the current transaction block. The GC module 1390 does this because if the object was allocated after the transaction began and is now unreachable, it will be lost whether or not the transaction commits. In one implementation, log entries for unreachable objects which were allocated within sub-transactions of the current transactions are also removed.

At block 2430, for each entry in the read-object log, the object that the entry refers to is examined and if the object is already in the updated objects log, and the versioning numbers of the read-object and update-object logs match for the object, then the read-object log entry can be removed. This process can identify both when the object was added to the read-objects log first, and those when the object was added to the updated-objects log first. In either event, the GC serves to remove subsumed read-object log entries.

At block, 2440, the GC module 1390 removes duplicate entries from the read-object log in STM implementations which allow for duplicate entries. An example process of duplicate read-object log entry removal is described below with reference to FIG. 25. At block, 2450, then, the GC module 1390 reviews entries in the undo log and compares the "previous value" in the log with the current value of the logged memory location. If these match, the value has not changed, and there is no reason to maintain the undo log entry, so the GC module 1390 removes these entries.

Figure 25:
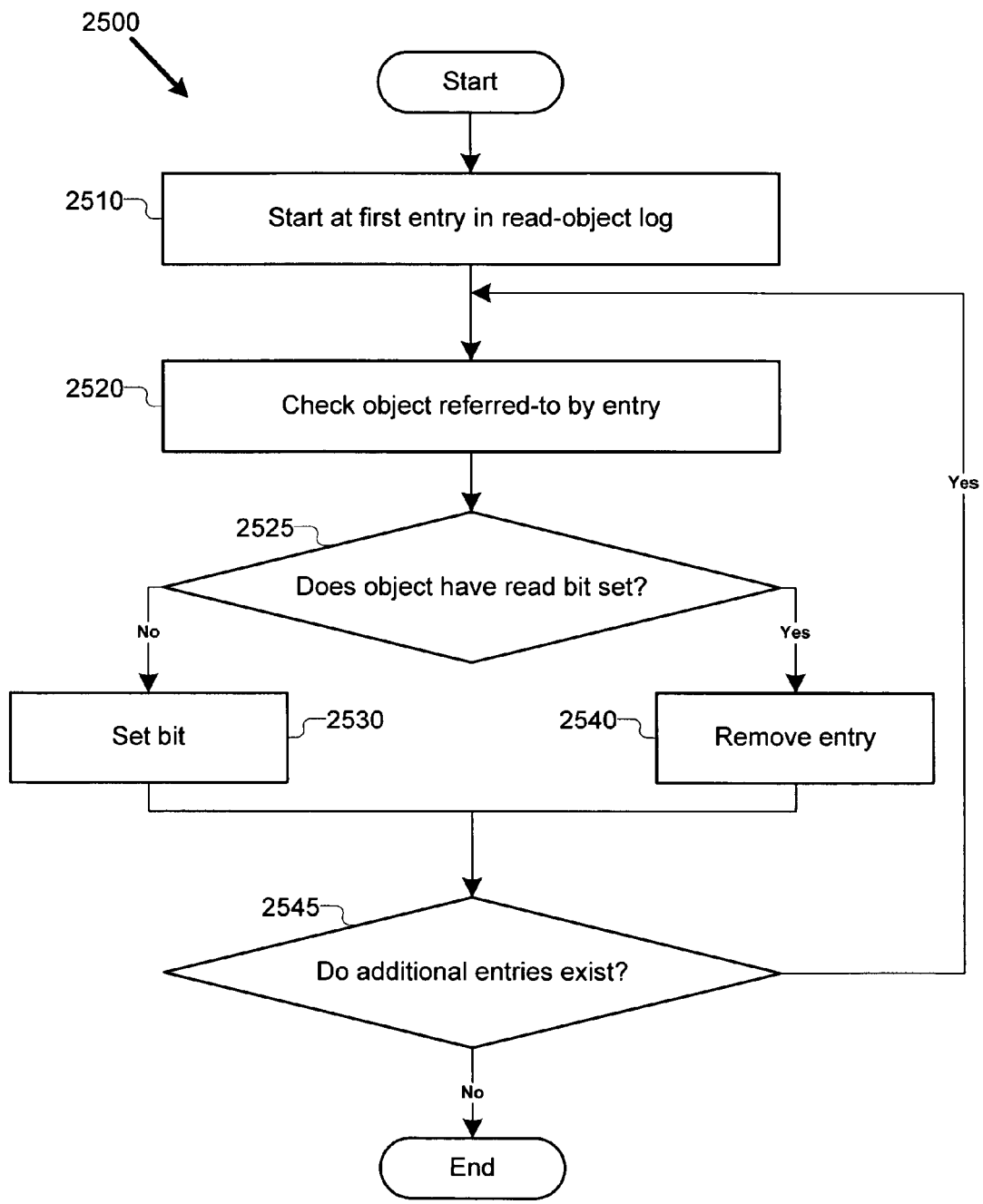
FIG. 25 is a flowchart illustrating a further example process performed of the runtime environment of FIG. 6 for compacting logs during garbage collection.

FIG. 25 is a flowchart illustrating one such example process 2500 performed by the garbage collecting module 1390 for removing duplicate read-object log entries. The process of FIG. 25 corresponds to block 2440 of FIG. 24. In various implementations, the illustrated process blocks may be merged, divided into sub-blocks, or omitted. The process of FIG. 25 takes advantage of the fact that a read-object log entry only records that the object has been opened for a read within the current transaction. This renders multiple entries for a single object superfluous, and thus it is beneficial to remove these entries during GC.

The process of FIG. 25 takes advantage of a single read bit flag which is maintained for each object during garbage collection. In one implementation, this flag is kept by the runtime system, similarly to how the STM word is kept. In another implementation, the GC module 1390 maintains flags for each object at GC time. The process begins at block 2510, where the GC module 1390 starts compacting the read-object log at the first entry in the log. Next, at block 2520, the object referred-to by the currently-reviewed entry is reviewed. At block 2525, the GC module 1390 determines if the object has its read bit set. If not, the current entry is assumed to be the first entry for the object. Thus, at block 2530, the read bit is set and the entry is left alone. However, if the GC module 1390 determines that the read bit has been previously set at block 2540, the module removes the current entry, as it is superfluous to a previous entry for the object. In one implementation, this removal is done in place by copying entries which are kept to locations of entries which are removed. In other implementations, entries are not moved and are simply de-allocated where the lie. The process then continues to decision block, 2545, where the module determines if additional entries exist in the read-object log. If so, the process continues. If not, the process ends.

7. Computing Environment

The above software transactional memory techniques can be performed on any of a variety of computing devices. The techniques can be implemented in hardware circuitry, as well as in software executing within a computer or other computing environment, such as shown in FIG. 16.

Figure 26:
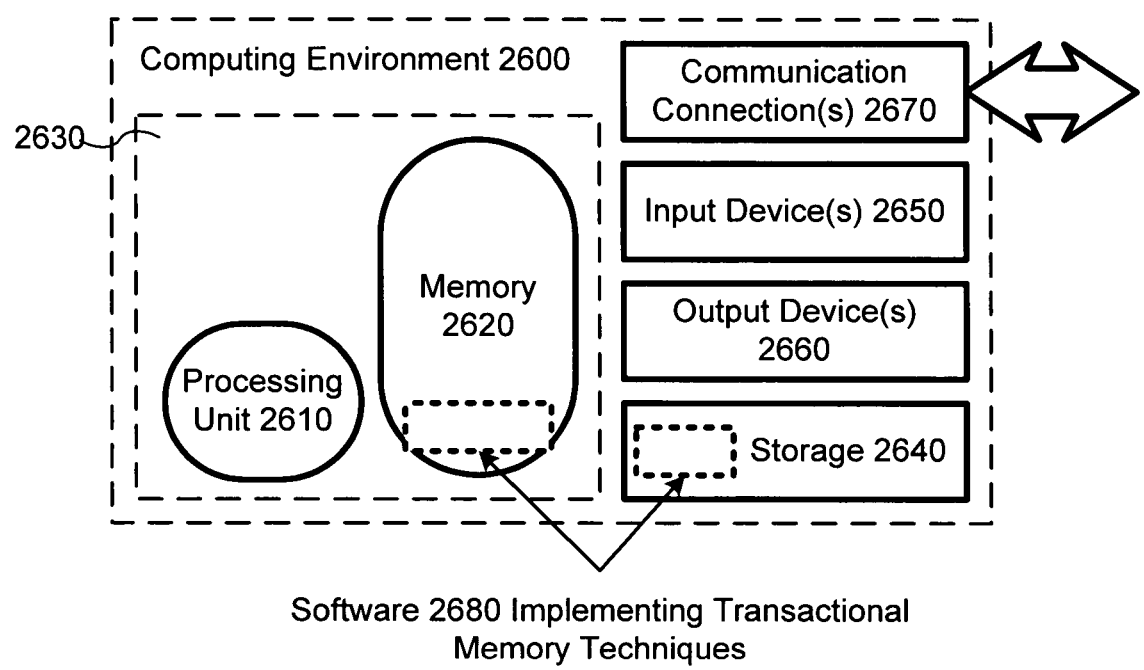
FIG. 26 is a block diagram of a suitable computing environment for implementing the techniques herein.

FIG. 26 illustrates a generalized example of a suitable computing environment (2600) in which described embodiments may be implemented. The computing environment (2600) is not intended to suggest any limitation as to scope of use or functionality of the invention, as the present invention may be implemented in diverse general-purpose or special-purpose computing environments.

With reference to FIG. 26, the computing environment (2600) includes at least one processing unit (2610) and memory (2620). In FIG. 26, this most basic configuration (2630) is included within a dashed line. The processing unit (2610) executes computer-executable instructions and may be a real or a virtual processor. In a multi-processing system, multiple processing units execute computer-executable instructions to increase processing power. The memory (2620) may be volatile memory (e.g., registers, cache, RAM), non-volatile memory (e.g., ROM, EEPROM, flash memory, etc.), or some combination of the two. The memory (2620) stores software (2680) implementing the described techniques.

A computing environment may have additional features. For example, the computing environment (2600) includes storage (2640), one or more input devices (2650), one or more output devices (2660), and one or more communication connections (2670). An interconnection mechanism (not shown) such as a bus, controller, or network interconnects the components of the computing environment (2600). Typically, operating system software (not shown) provides an operating environment for other software executing in the computing environment (2600), and coordinates activities of the components of the computing environment (2600).

The storage (2640) may be removable or non-removable, and includes magnetic disks, magnetic tapes or cassettes, CD-ROMs, CD-RWs, DVDs, or any other medium which can be used to store information and which can be accessed within the computing environment (2600). The storage (2640) stores instructions for the software (2680) implementing the described techniques.

The input device(s) (2650) may be a touch input device such as a keyboard, mouse, pen, or trackball, a voice input device, a scanning device, or another device that provides input to the computing environment (2600). For audio, the input device(s) (2650) may be a sound card or similar device that accepts audio input in analog or digital form, or a CD-ROM reader that provides audio samples to the computing environment. The output device(s) (2660) may be a display, printer, speaker, CD-writer, or another device that provides output from the computing environment (2600).

The communication connection(s) (2670) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques described herein can be described in the general context of computer-readable media. Computer-readable media are any available media that can be accessed within a computing environment. By way of example, and not limitation, with the computing environment (2600), computer-readable media include memory (2620), storage (2640), communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "compare," and "write" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A method of compiling a program, the program including software transactional memory blocks and the method comprising:
   by a computer, optimizing the program to create an optimized program containing software transactional memory instructions;
   wherein optimizing the program comprises:
   (a) inserting one or more word-based direct-access software transactional memory instructions at the software transactional memory blocks;
   (b) replacing the one or more word-based direct-access software transactional memory instructions with decomposed software transactional memory instructions in the program at the software transactional memory blocks;
   and
   (c) performing optimizations on the program to create the optimized program, such that at least some of the optimizations are configured to operate specifically on the decomposed software transactional memory instructions;
   wherein performing optimizations comprises performing a common subexpression elimination procedure which is modified to operate on decomposed software transactional memory instructions such that a decomposed software transactional memory instruction to open an object for read, that comprises a parameter that references the object, is eliminated which takes place after a decomposed software transactional memory instruction to open the object for update within a same transaction;
   wherein the optimizations are performed within software transactional memory constraints, the software transactional memory constraints comprising data dependencies which are introduced into the decomposed software transactional memory instructions;
   wherein the data dependencies enforce a call order based on output variables for at least some of the decomposed software transactional memory instructions being input variables for subsequent decomposed software transactional memory instructions; and
   compiling the optimized program.

2. The method of claim 1, further comprising compiling the program into an intermediate representation, and wherein performing the optimizations comprises performing optimizations on the intermediate representation.

3. The method of claim 2, wherein the intermediate representation comprises representations of the decomposed software transactional memory instructions.

4. The method of claim 1, wherein the common subexpression elimination procedure is further modified such that redundant reads and writes to memory addresses and redundant logs for memory addresses within a transaction are removed.

5. The method of claim 4, wherein the common subexpression elimination procedure is further modified such that reads and writes in a first transaction are eliminated if they are made redundant by reads or writes in a second transaction, wherein the first transaction is nested within the second transaction.

6. The method of claim 3, wherein performing the optimizations comprises performing code motion optimizations.

7. The method of claim 3, wherein the software transactional memory constraints comprise constraints on a control flow graph of the program.

8. A compiler system for compiling a program containing software transactional memory blocks, the system comprising:
   a processor;
   a memory;
   a first compilation module configured to represent source code of the program as an intermediate representation comprising, at least in part, representations of decomposed software transactional memory instructions, the decomposed software transactional memory instructions replacing at least one or more word-based software transactional memory instructions; and
   an optimization module configured to optimize an intermediate representation for the source code of the program, the intermediate representation comprising, at least in part, decomposed software transactional memory instructions;
   wherein the optimization module is further configured to perform a common subexpression elimination on the decomposed software transactional memory instructions, the common subexpression elimination comprising removing a redundant decomposed software transactional memory instruction to open an object for reading, that comprises a parameter that references the object, located after a decomposed software transactional memory instruction to open the object for updating within a same transaction;
   wherein the representations of decomposed software transactional memory instructions are optimized at least in part according to software transactional memory optimization rules, the software transactional memory optimization rules comprising data dependencies in the decomposed software transactional memory instructions;
   wherein the data dependencies enforce a call order based on output variables for at least some of the decomposed software transactional memory instructions being input variables for subsequent decomposed software transactional memory instructions; and
   a second compilation module configured to compile the optimized intermediate representation into an executable form.

9. The system of claim 8, wherein the optimization module is further configured to:
   remove redundant memory and log accesses for software transactional memory instructions; and
   perform code motion optimizations on software transactional memory instructions.

10. One or more computer-readable storage memories or magnetic disk containing instructions which, when executed by a computer, cause the computer to perform a method for optimizing a program comprising decomposed direct-access software transactional memory instructions, the method comprising:
   receiving an intermediate representation of the program comprising a control-flow graph, the intermediate representation including representations of the decomposed direct-access software transactional memory instructions located in the program in software transactional memory, blocks marked as atomic, wherein the decomposed direct-access software transactional memory, instructions replace at least one or more word-based software transactional memory instructions in one or more transactions that perform operations directly to a heap; and
   applying optimization rules specific to decomposed direct-access software transactional memory instructions in order to optimize the representations of the decomposed direct-access software transactional memory instructions, wherein applying optimization rules comprises:
   performing a modified common subexpression elimination on the decomposed direct-access software transactional memory instructions which eliminates read open instructions which occur after update open instructions, wherein a respective read open instruction of the eliminated read open instructions comprises a parameter that references an object and the respective read open instruction is subsumed by a respective update open instruction of the update open instructions;
   wherein the modified common subexpression elimination procedure also eliminates read open instructions of the decomposed direct-access software transactional memory instructions in a first transaction which are made redundant and subsumed by read open instructions or update open instructions of the decomposed direct-access software transactional memory instructions in a second transaction, wherein the first transaction is nested within the second transaction;
   removing redundant load-store elimination for decomposed direct-access software transactional memory instructions which comprise reads, writes, and entries to logs; and
   performing code motion optimizations for decomposed direct-access software transactional memory instructions;
   wherein the optimization rules comprise restrictions on the control-flow graph for the intermediate representation, the restrictions on the control-flow graph comprising data dependencies between decomposed direct-access software transactional memory instructions, wherein the data dependencies enforce a call order, at least for atomicity, which enforces that a location is open for reading when read or the location is open for updating when updated or a store is logged for the location when updated, the enforcement based on output variables for decomposed direct-access software transactional memory instructions being input variables for-subsequent decomposed direct access software transactional memory instructions.

* * * * *